US012495383B2

(12) United States Patent
Ghazvinian Zanjani et al.

(10) Patent No.: US 12,495,383 B2
(45) Date of Patent: Dec. 9, 2025

(54) ZERO-SHOT DEEP LEARNING FOR MULTI-TARGET RF POSITIONING

(71) Applicant: QUALCOMM Incorporated, San Diego, CA (US)

(72) Inventors: Farhad Ghazvinian Zanjani, Almere (NL); Daniel Hendricus Franciscus Dijkman, Haarlem (NL); Hanno Ackermann, Amsterdam (NL); Ishaque Ashar Kadampot, San Diego, CA (US); Stephen Jay Shellhammer, Ramona, CA (US); Brian Michael Buesker, San Diego, CA (US); Fatih Murat Porikli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 396 days.

(21) Appl. No.: 18/163,216

(22) Filed: Feb. 1, 2023

(65) Prior Publication Data
US 2024/0259984 A1 Aug. 1, 2024

(51) Int. Cl.
*H04W 64/00* (2009.01)
*G06N 3/088* (2023.01)

(52) U.S. Cl.
CPC ............ *H04W 64/00* (2013.01); *G06N 3/088* (2013.01)

(58) Field of Classification Search
None
See application file for complete search history.

(56) References Cited

U.S. PATENT DOCUMENTS

2021/0215789 A1* 7/2021 Hu ......................... G01S 7/415
2023/0362588 A1* 11/2023 Golestanian ............ H04W 4/33

* cited by examiner

*Primary Examiner* — Suhail Khan
(74) *Attorney, Agent, or Firm* — Procopio, Cory, Hargreaves & Savitch LLP

(57) ABSTRACT

Aspects presented herein may enable a passive positioning system, which may be a network entity or node, to be trained to identify multiple moving objects based on using training data for a single object. In one aspect, a network entity receives first RF channel data recorded by a set of devices for a coverage area during a first time period. The network entity trains an ML model based on the set of devices and the first RF channel data. The network entity receives second RF channel data recorded by the set of devices at a second time instance that is outside of the first time period. The network entity computes a number of moving objects in the coverage area at the second time instance based on the second RF channel data using the ML model.

28 Claims, 16 Drawing Sheets

ZERO-SHOT DEEP LEARNING FOR MULTI-TARGET RF POSITIONING

TECHNICAL FIELD

The present disclosure relates generally to communication systems, and more particularly, to a wireless communication involving radio frequency (RF)-based positioning.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus receives first radio frequency (RF) channel data recorded by a set of devices for a coverage area during a first time period. The apparatus trains a machine learning (ML) model based on the set of devices and the first RF channel data. The apparatus receives second RF channel data recorded by the set of devices at a second time instance that is outside of the first time period. The apparatus computes a number of moving objects in the coverage area at the second time instance based on the second RF channel data using the ML model.

To the accomplishment of the foregoing and related ends, the one or more aspects may include the features hereinafter fully described and particularly pointed out in the claims. The following description and the drawings set forth in detail certain illustrative features of the one or more aspects. These features are indicative, however, of but a few of the various ways in which the principles of various aspects may be employed.

to perform multi-person passive RF positioning based on a single-person data in accordance with various aspects of the present disclosure.

Figure 14:
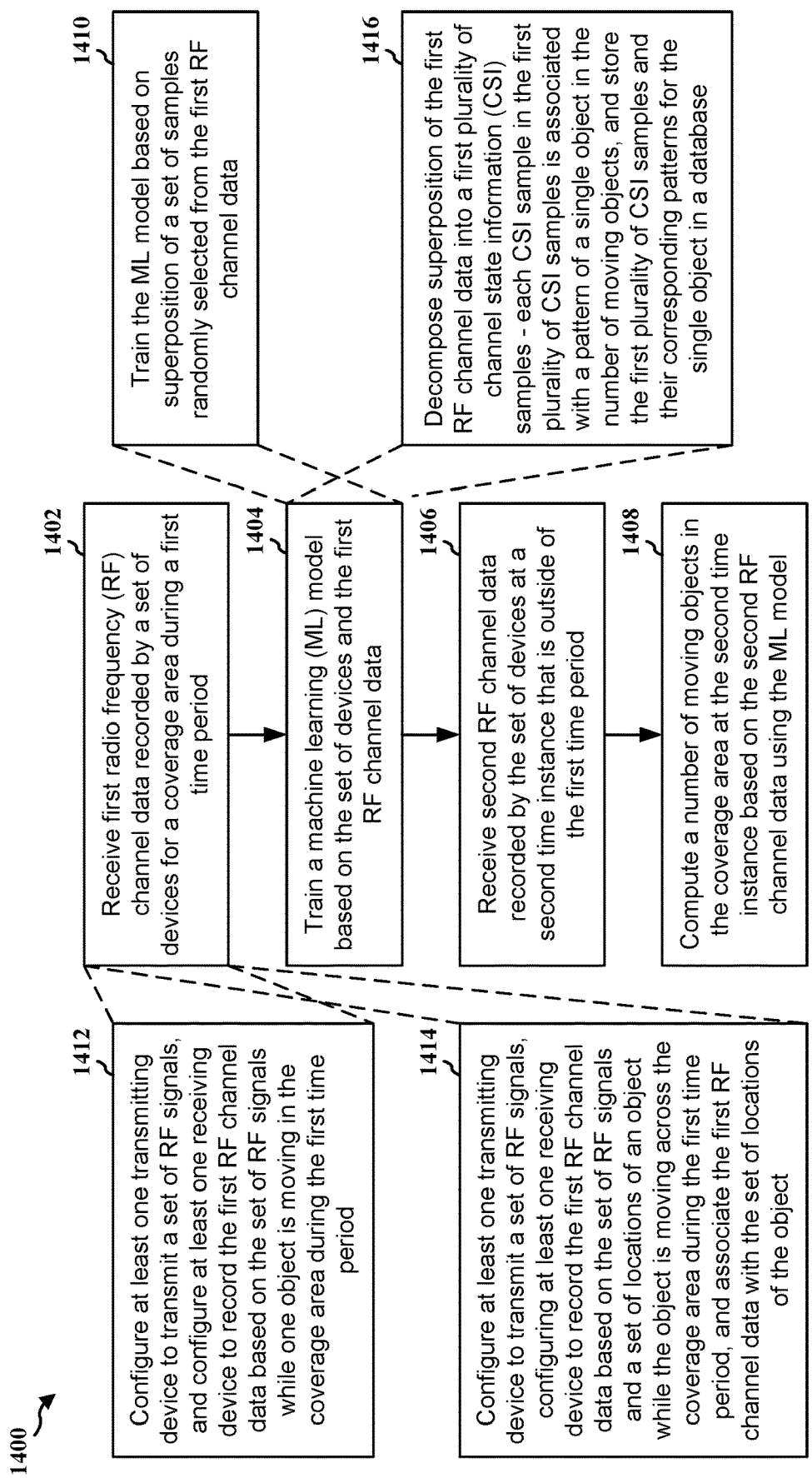

FIG. 14 is a flowchart of a method of wireless communication.

Figure 15:
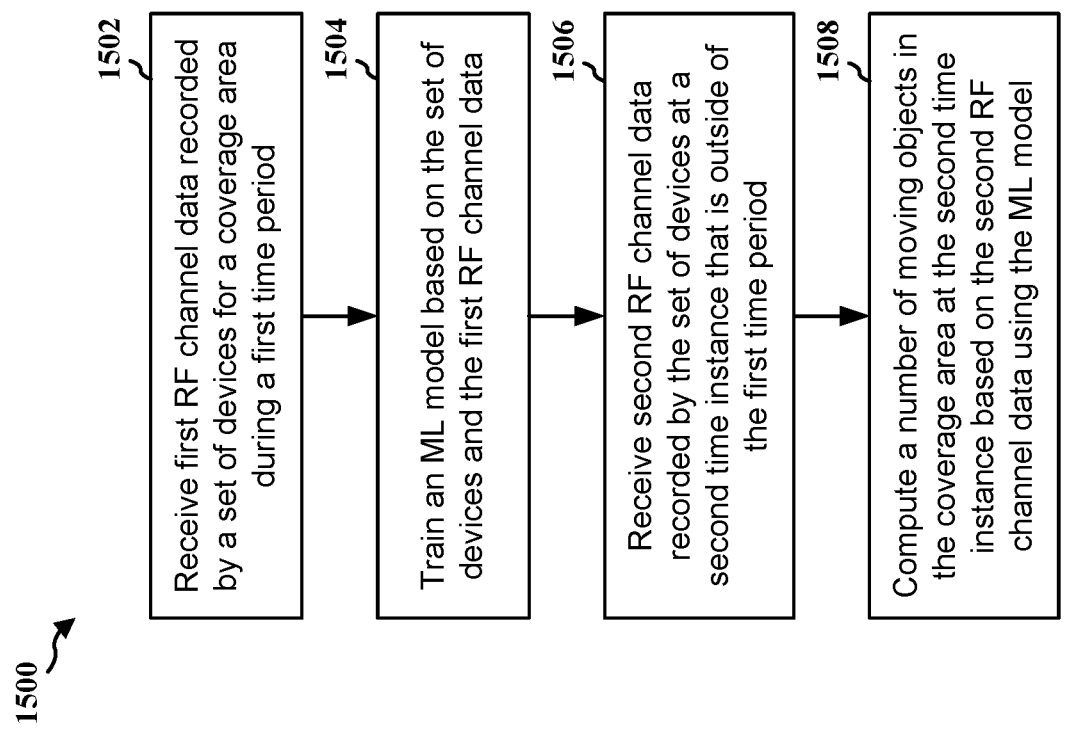

FIG. 15 is a flowchart of a method of wireless communication.

Figure 16:
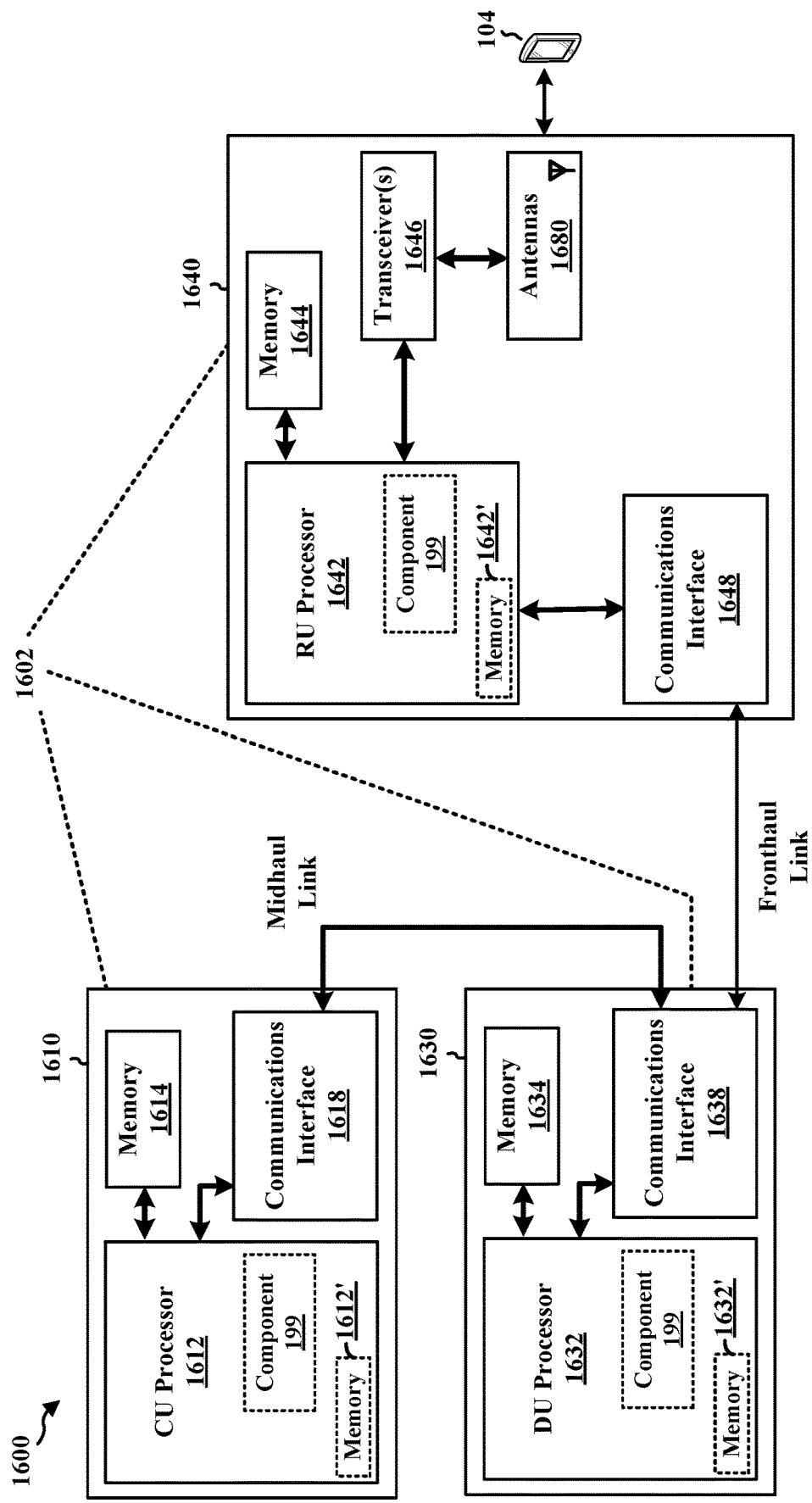

FIG. 16 is a diagram illustrating an example of a hardware implementation for an example apparatus and/or network entity.

DETAILED DESCRIPTION

Aspects presented herein may enable a passive positioning system to be trained to identify multiple moving objects based on using training data for a single object. For example, a passive positioning system may be trained to identify a number of people (e.g., moving people) in a defined area (e.g., an indoor environment) based on using a single-person data. In one aspect of the present disclosure, a passive positioning system may be configured to performs people counting in an unsupervised setup. In another aspect of the present disclosure, the passive positioning system may further be configured to perform room classification and precise positioning (e.g., identifying that a person is in a specified area) if the single-person data is also associated with room labels. Aspects presented herein also provided an improved machine learning (ML)/deep learning (DL) approach to passive positioning, such as passive Wi-Fi/Bluetooth/UWB positioning (which may collectively be referred to as "passive RF positioning" or "passive RF-based positioning"), where moving object(s), including humans and animals, may be localized on a given two-dimensional (2D) and/or three-dimensional (3D) map by processing the Wi-Fi/Bluetooth/UWB communication channel measured by one or several access points (e.g., receivers) and using deep learning methods and source separation technique.

Particular aspects of the subject matter described in this disclosure can be implemented to realize one or more of the following potential advantages. By enabling a passive positioning system to be trained using single-object data, the training for the passive positioning system may become more practical compared to using multi-object data, where on-site multi-person training data may be difficult to obtain. In addition, aspects presented herein may perform people counting in an unsupervised setup. By minor modification to the model architecture, aspects presented herein may also be used for source separation task that may be desirable in many signal processing applications such as sound/speech separation.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can include a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmission reception point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

Figure 1:
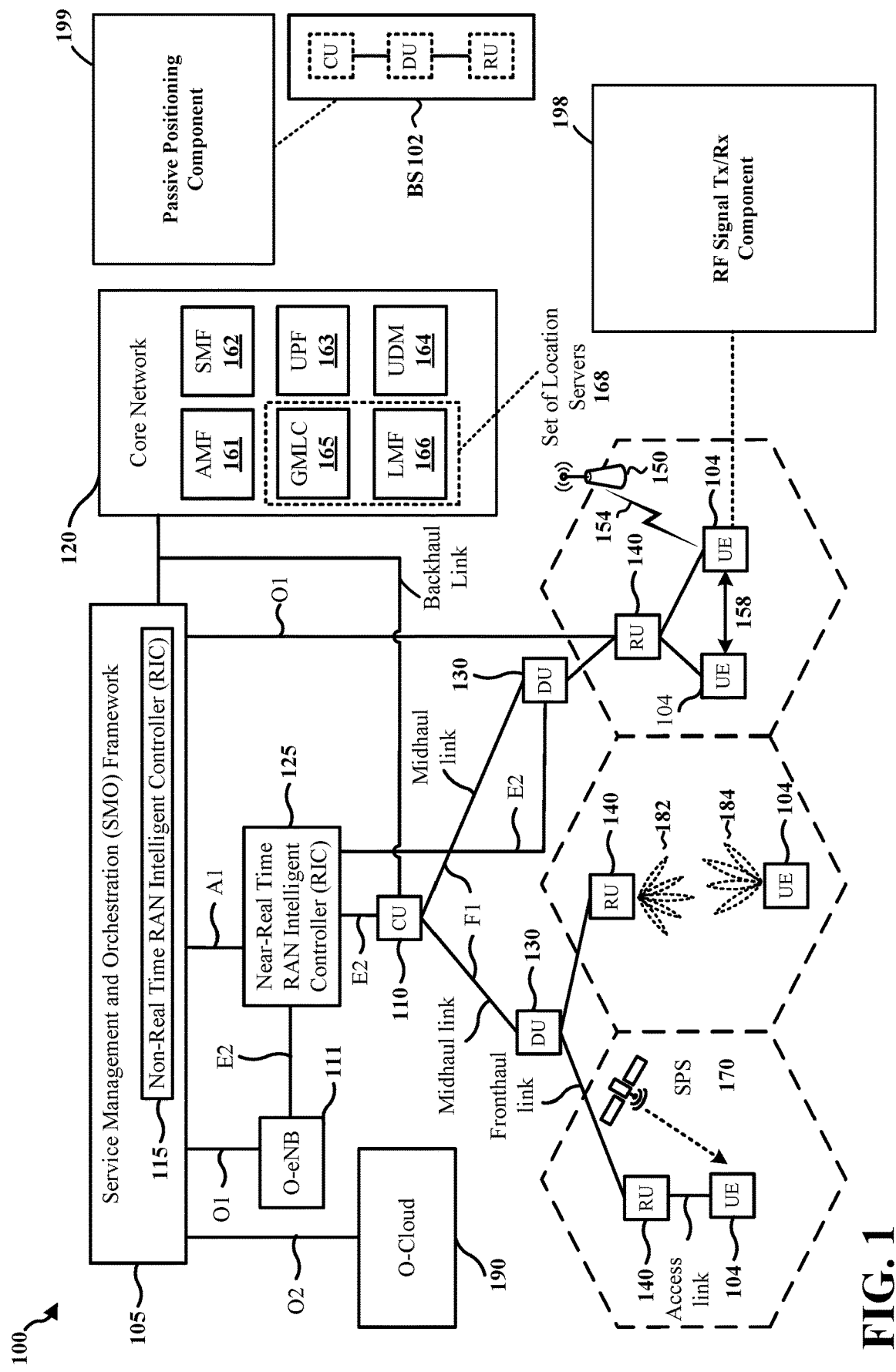
FIG. 1 is a diagram illustrating an example of a wireless communications system and an access network.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUS 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit wireless signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit-User Plane (CU-UP)), control plane functionality (i.e., Central Unit-Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via O1) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base station 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base station 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth®, Wi-Fi based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHz-7.125 GHZ) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHZ). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHZ), and FR5 (114.25 GHz-300 GHz). Each of these higher frequency bands falls within the EHF band.

With the above aspects in mind, unless specifically stated otherwise, the term "sub-6 GHz" or the like if used herein may broadly represent frequencies that may be less than 6 GHZ, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a TRP, network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the base station 102 serving the UE 104. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the base station 102 may have a passive positioning component 199 that may be configured to receive first RF channel data recorded by a set of devices for a coverage area during a first time period; train an ML model based on the set of devices and the first RF channel data; receive second RF channel data recorded by the set of devices at a second time instance that is outside of the first time period; and compute a number of moving objects in the coverage area at the second time instance based on the second RF channel data using the ML model. In certain aspects, the UE 104 may include an RF signal Tx/Rx component 198 that may be configured to transmit and receive RF signals in the coverage area.

Figure 2:
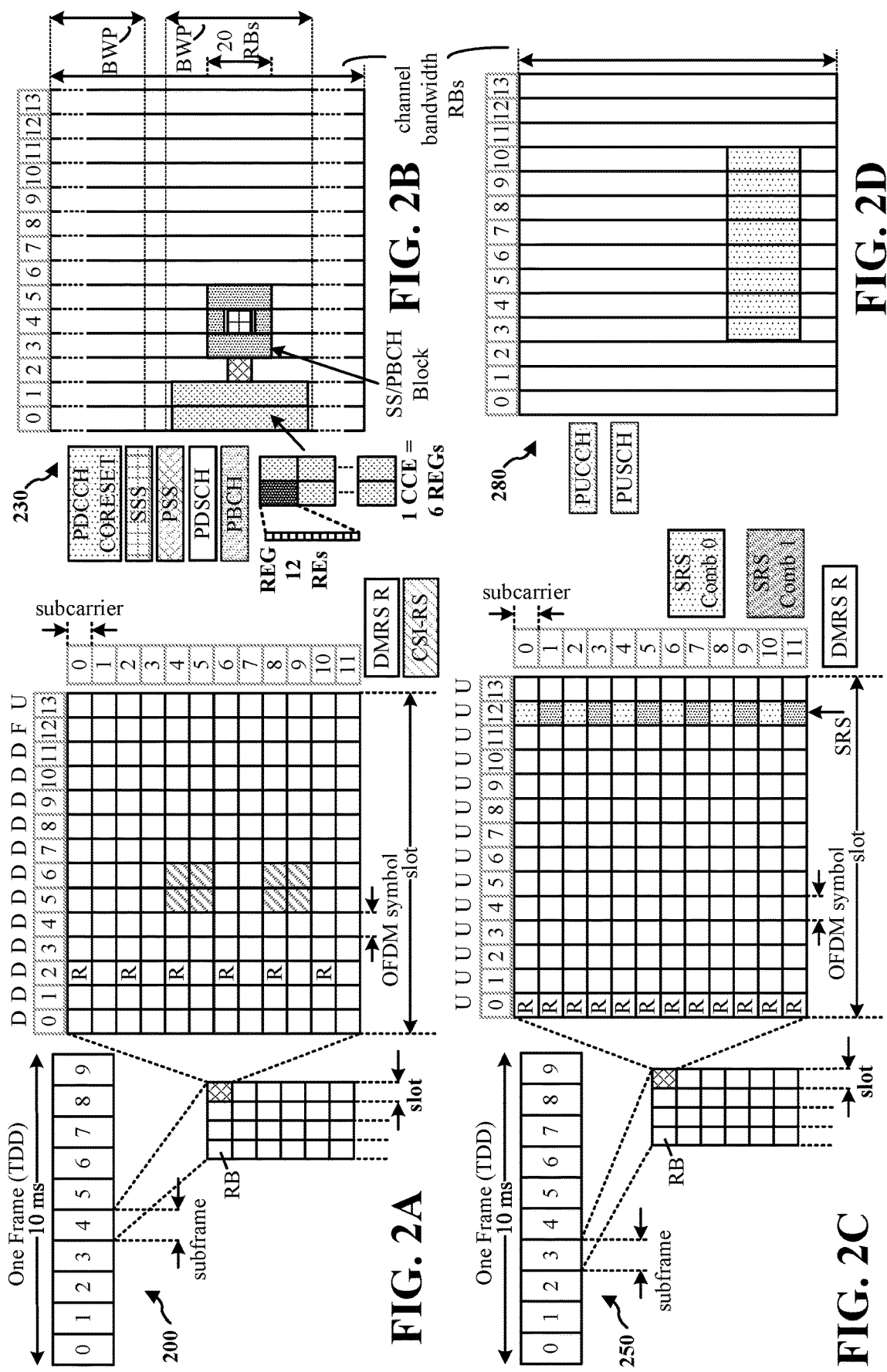
FIG. 2A is a diagram illustrating an example of a first frame, in accordance with various aspects of the present disclosure.
FIG. 2B is a diagram illustrating an example of downlink (DL) channels within a subframe, in accordance with various aspects of the present disclosure.
FIG. 2C is a diagram illustrating an example of a second frame, in accordance with various aspects of the present disclosure.
FIG. 2D is a diagram illustrating an example of uplink (UL) channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (for power limited scenarios; limited to a single stream transmission). The number of slots within a subframe is based on the CP and the numerology. The numerology defines the subcarrier spacing (SCS) (see Table 1). The symbol length/duration may scale with 1/SCS.

TABLE 1

Numerology, SCS, and CP

| $\mu$ | SCS $\Delta f = 2^\mu \cdot 15 [kHz]$ | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |
| 5 | 480 | Normal |
| 6 | 960 | Normal |

For normal CP (14 symbols/slot), different numerologies $\mu$ 0 to 4 allow for 1, 2, 4, 8, and 16 slots, respectively, per subframe. For extended CP, the numerology 2 allows for 4 slots per subframe. Accordingly, for normal CP and numerology u, there are 14 symbols/slot and $2^\mu$ slots/subframe.

The subcarrier spacing may be equal to $2^\mu*15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of normal CP with 14 symbols per slot and numerology $\mu=2$ with 4 slots per subframe. The slot duration is 0.25 ms, the subcarrier spacing is 60 kHz, and the symbol duration is approximately 16.67 $\mu$s. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
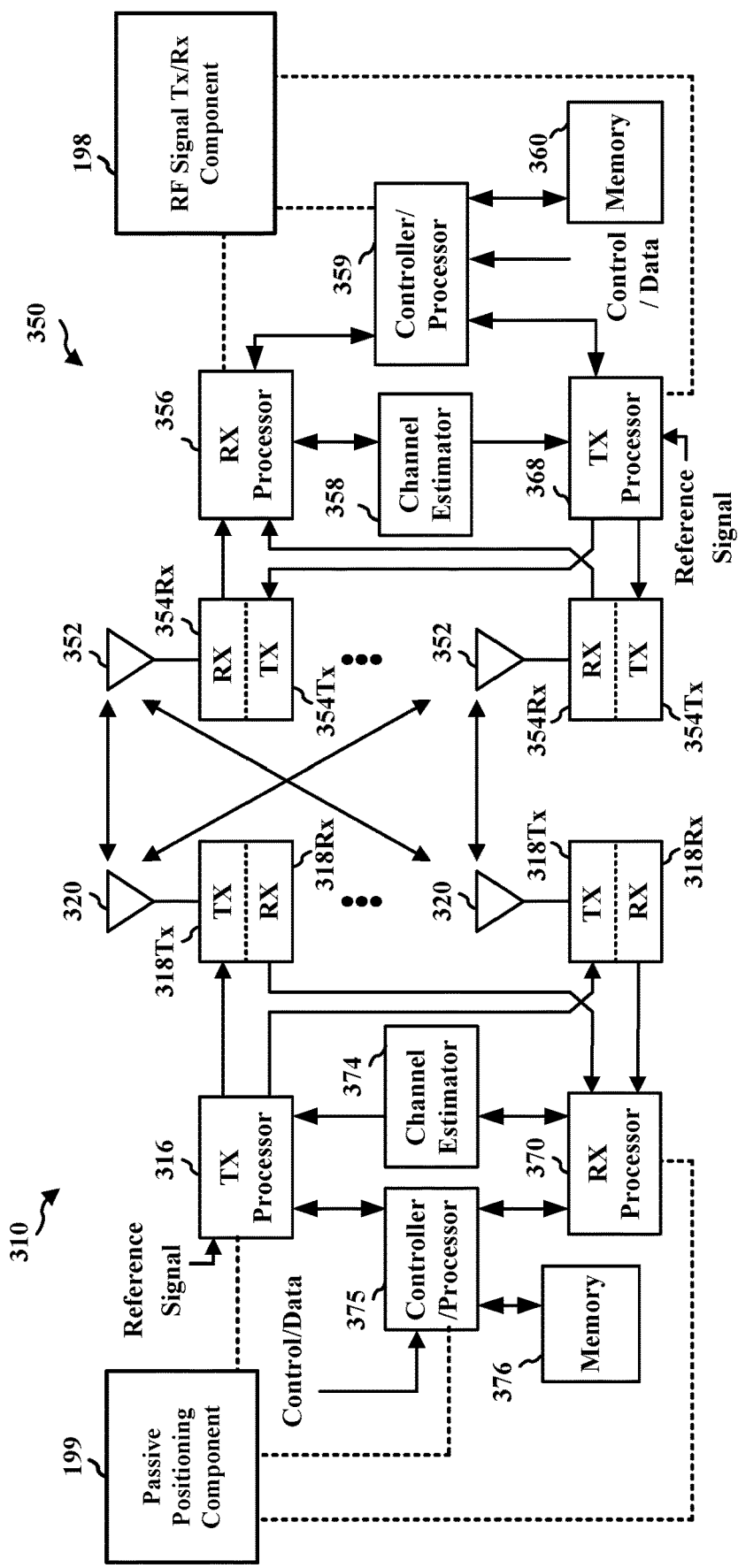
FIG. 3 is a diagram illustrating an example of a base station and user equipment (UE) in an access network.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency-domain, and then combined together using an Inverse Fast Fourier Transform (IFFT) to produce a physical channel carrying a time-domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency-domain using a Fast Fourier Transform (FFT). The frequency-domain signal includes a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with the RF signal Tx/Rx component 198 of FIG. 1.

At least one of the TX processor 316, the RX processor 370, and the controller/processor 375 may be configured to perform aspects in connection with the passive positioning component 199 of FIG. 1.

Figure 4:
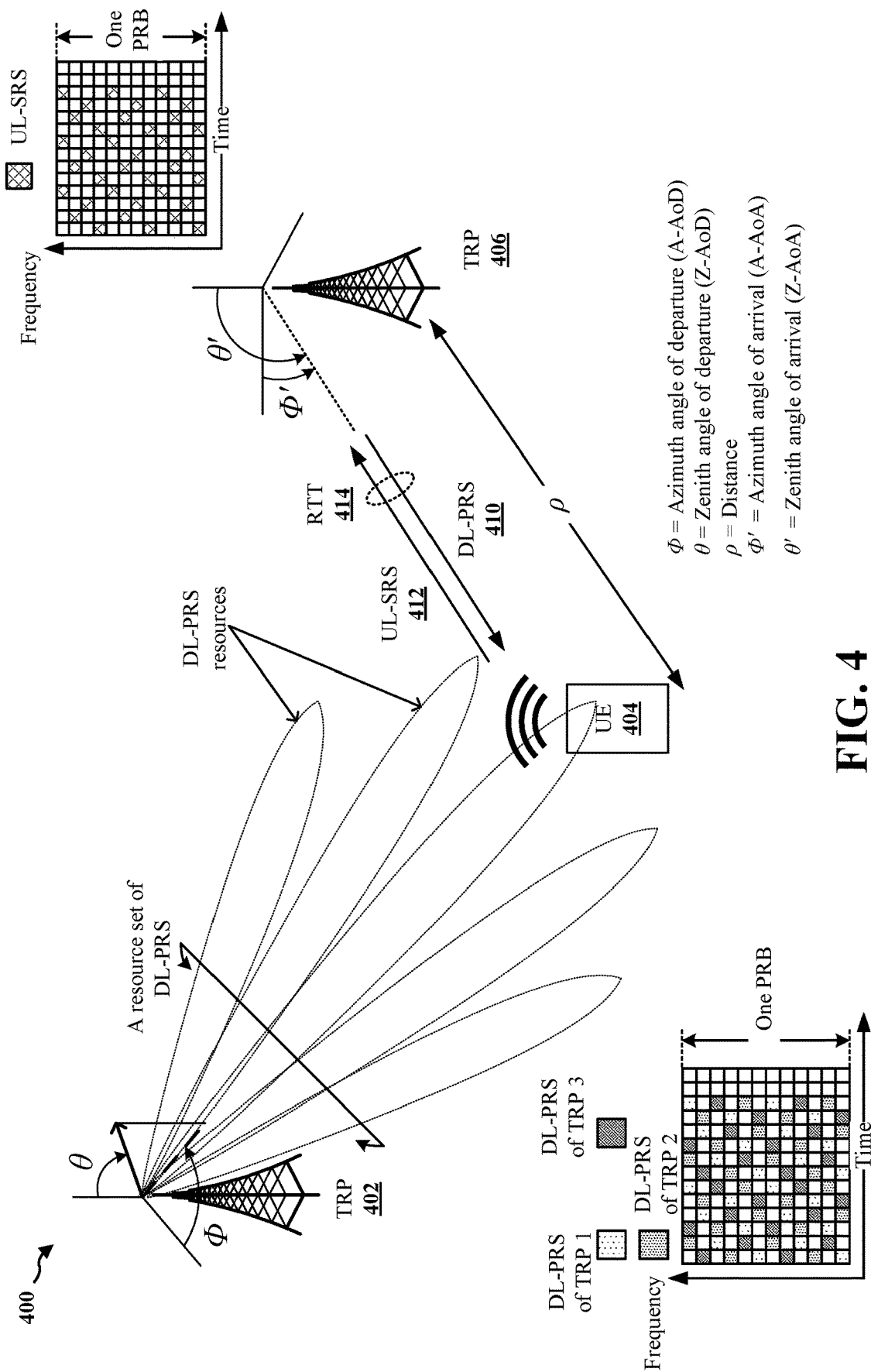
FIG. 4 is a diagram illustrating an example of a UE positioning based on reference signal measurements.

FIG. 4 is a diagram 400 illustrating an example of a UE positioning based on reference signal measurements (which may also be referred to as "network-based positioning") in accordance with various aspects of the present disclosure. The UE 404 may transmit UL-SRS 412 at time $T_{SRS\_TX}$ and receive DL positioning reference signals (PRS) (DL-PRS) 410 at time $T_{PRS\_RX}$. The TRP 406 may receive the UL-SRS 412 at time $T_{SRS\_RX}$ and transmit the DL-PRS 410 at time $T_{PRS\_TX}$. The UE 404 may receive the DL-PRS 410 before transmitting the UL-SRS 412, or may transmit the UL-SRS 412 before receiving the DL-PRS 410. In both cases, a positioning server (e.g., location server(s) 168) or the UE 404 may determine the RTT 414 based on $\|T_{SRS\_RX} - T_{PRS\_TX}\| - |T_{SRS\_TX} - T_{PRS\_RX}\|$. Accordingly, multi-RTT positioning may make use of the UE Rx-Tx time difference measurements (i.e., $|T_{SRS\_TX} - T_{PRS\_RX}|$) and DL-PRS reference signal received power (RSRP) (DL-PRS-RSRP) of downlink signals received from multiple TRPs 402, 406 and measured by the UE 404, and the measured TRP Rx-Tx time difference measurements (i.e., $|T_{SRS\_RX} - T_{PRS\_TX}|$) and UL-SRS-RSRP at multiple TRPs 402, 406 of uplink signals transmitted from UE 404. The UE 404 measures the UE Rx-Tx time difference measurements (and optionally DL-PRS-RSRP of the received signals) using assistance data received from the positioning server, and the TRPs 402, 406 measure the gNB Rx-Tx time difference measurements (and optionally UL-SRS-RSRP of the received signals) using assistance data received from the positioning server. The measurements may be used at the positioning server or the UE 404 to determine the RTT, which is used to estimate the location of the UE 404. Other methods are possible for determining the RTT, such as for example using DL-TDOA and/or UL-TDOA measurements.

PRSs may be defined for network-based positioning (e.g., NR positioning) to enable UEs to detect and measure more neighbor transmission and reception points (TRPs), where multiple configurations are supported to enable a variety of deployments (e.g., indoor, outdoor, sub-6, mmW, etc.). To support PRS beam operation, beam sweeping may also be configured for PRS. The UL positioning reference signal may be based on sounding reference signals (SRSs) with enhancements/adjustments for positioning purposes. In some examples, UL-PRS may be referred to as "SRS for positioning," and a new Information Element (IE) may be configured for SRS for positioning in RRC signaling.

DL PRS-RSRP may be defined as the linear average over the power contributions (in [W]) of the resource elements of the antenna port(s) that carry DL PRS reference signals configured for RSRP measurements within the considered measurement frequency bandwidth. In some examples, for FR1, the reference point for the DL PRS-RSRP may be the antenna connector of the UE. For FR2, DL PRS-RSRP may be measured based on the combined signal from antenna elements corresponding to a given receiver branch. For FR1 and FR2, if receiver diversity is in use by the UE, the reported DL PRS-RSRP value may not be lower than the corresponding DL PRS-RSRP of any of the individual receiver branches. Similarly, UL SRS-RSRP may be defined as linear average of the power contributions (in [W]) of the resource elements carrying sounding reference signals (SRS). UL SRS-RSRP may be measured over the configured resource elements within the considered measurement frequency bandwidth in the configured measurement time occasions. In some examples, for FR1, the reference point for the UL SRS-RSRP may be the antenna connector of the base station (e.g., gNB). For FR2, UL SRS-RSRP may be measured based on the combined signal from antenna elements corresponding to a given receiver branch. For FR1 and FR2, if receiver diversity is in use by the base station, the reported UL SRS-RSRP value may not be lower than the corresponding UL SRS-RSRP of any of the individual receiver branches.

PRS-path RSRP (PRS-RSRPP) may be defined as the power of the linear average of the channel response at the i-th path delay of the resource elements that carry DL PRS signal configured for the measurement, where DL PRS-RSRPP for the 1st path delay is the power contribution corresponding to the first detected path in time. In some examples, PRS path Phase measurement may refer to the phase associated with an i-th path of the channel derived using a PRS resource.

DL-AoD positioning may make use of the measured DL-PRS-RSRP of downlink signals received from multiple TRPs 402, 406 at the UE 404. The UE 404 measures the DL-PRS-RSRP of the received signals using assistance data received from the positioning server, and the resulting measurements are used along with the azimuth angle of departure (A-AoD), the zenith angle of departure (Z-AoD), and other configuration information to locate the UE 404 in relation to the neighboring TRPs 402, 406.

DL-TDOA positioning may make use of the DL reference signal time difference (RSTD) (and optionally DL-PRS-RSRP) of downlink signals received from multiple TRPs 402, 406 at the UE 404. The UE 404 measures the DL RSTD (and optionally DL-PRS-RSRP) of the received signals using assistance data received from the positioning server, and the resulting measurements are used along with other configuration information to locate the UE 404 in relation to the neighboring TRPs 402, 406.

UL-TDOA positioning may make use of the UL relative time of arrival (RTOA) (and optionally UL-SRS-RSRP) at multiple TRPs 402, 406 of uplink signals transmitted from UE 404. The TRPs 402, 406 measure the UL-RTOA (and optionally UL-SRS-RSRP) of the received signals using assistance data received from the positioning server, and the resulting measurements are used along with other configuration information to estimate the location of the UE 404.

UL-AoA positioning may make use of the measured azimuth angle of arrival (A-AoA) and zenith angle of arrival (Z-AoA) at multiple TRPs 402, 406 of uplink signals transmitted from the UE 404. The TRPs 402, 406 measure the A-AoA and the Z-AoA of the received signals using assistance data received from the positioning server, and the resulting measurements are used along with other configuration information to estimate the location of the UE 404. For purposes of the present disclosure, a positioning operation in which measurements are provided by a UE to a base station/positioning entity/server to be used in the computation of the UE's position may be described as "UE-assisted," "UE-assisted positioning," and/or "UE-assisted position calculation," while a positioning operation in which a UE measures and computes its own position may be described as "UE-based," "UE-based positioning," and/or "UE-based position calculation."

Additional positioning methods may be used for estimating the location of the UE 404, such as for example, UE-side UL-AoD and/or DL-AoA. Note that data/measurements from various technologies may be combined in various ways to increase accuracy, to determine and/or to enhance certainty, to supplement/complement measurements, and/or to substitute/provide for missing information. For example, some UE positioning mechanisms may be radio access technology (RAT)-dependent (e.g., the positioning of a UE is based on a RAT), such as the downlink positioning (e.g., measuring of observed time difference of arrival (OTDOA), the uplink positioning (e.g., measuring of uplink time difference of arrival (UTDOA), and/or the combined DL and UL based positioning (e.g., measuring of RTT with respect to neighboring cells), etc. Some wireless communications systems may also support Enhanced Cell-ID (E-CID) positioning procedures that are based on radio resource management (RRM) measurements. On the other hand, some UE positioning mechanisms may be RAT-independent (e.g., the positioning of a UE does not rely on a RAT), such as the enhanced GNSS, and/or positioning technologies based on WLAN, Bluetooth, Terrestrial Beason System (TBS), and/or sensor based (e.g., barometric sensor, motion sensor), etc. Some UE positioning mechanisms may be based on a hybrid model, where multiple methods for positioning are used, which may include both RAT-dependent positioning technology and RAT-independent positioning technology (e.g., a GNSS with OTDOA hybrid positioning).

Note that the terms "positioning reference signal" and "PRS" generally refer to specific reference signals that are used for positioning in NR and LTE systems. However, as used herein, the terms "positioning reference signal" and "PRS" may also refer to any type of reference signal that can be used for positioning, such as but not limited to, PRS as defined in LTE and NR, TRS, PTRS, CRS, CSI-RS, DMRS, PSS, SSS, SSB, SRS, UL-PRS, etc. In addition, the terms "positioning reference signal" and "PRS" may refer to downlink or uplink positioning reference signals, unless otherwise indicated by the context. To further distinguish the type of PRS, a downlink positioning reference signal may be referred to as a "DL PRS," and an uplink positioning reference signal (e.g., an SRS-for-positioning, PTRS) may be referred to as an "UL-PRS." In addition, for signals that may be transmitted in both the uplink and downlink (e.g., DMRS, PTRS), the signals may be prepended with "UL" or "DL" to distinguish the direction. For example, "UL-DMRS" may be differentiated from "DL-DMRS."

Various network-based positioning methods may be suitable for indoor positioning as they do not rely on the reception of GNSS signals (e.g., using GNSS-based positioning), where GNSS signals generally degrade or become unavailable in an indoor environment. For example, indoor localization systems (e.g., systems for determining the position of one or more objects in an indoor environment) may use various techniques for positioning, such as based on measurements of time of arrival (TOA), time difference of arrival (TDOA), angle of arrival (AOA), and/or received signal strength indicator (RSSI) of reference signals, or based on neural implicit representation, etc.

In some examples, positioning methods/mechanisms may be classified into active positioning (which may also be referred to and used interchangeably with "active localization") and passive positioning (which may also be referred to and used interchangeably with "passive localization"). The class of active localization systems may specify that an object that is to be detected and tracked to carry a tag (e.g., a radio frequency (RF) tag) or a positioning device (e.g., which may be a UE or a device capable of transmitting/receiving positioning reference signals). On the other hand, for the class of passive location system, an object may be located and tracked without attaching a tag or a positioning device to the object. For example, in a passive localization system, such as a radar system, the reflection of electromagnetic wave from the surface of an object body may cause a distortion to the measured signal. Such distortions in communication channel may be the source of information for the sensing/perception task, like object/person localization.

Figure 5:
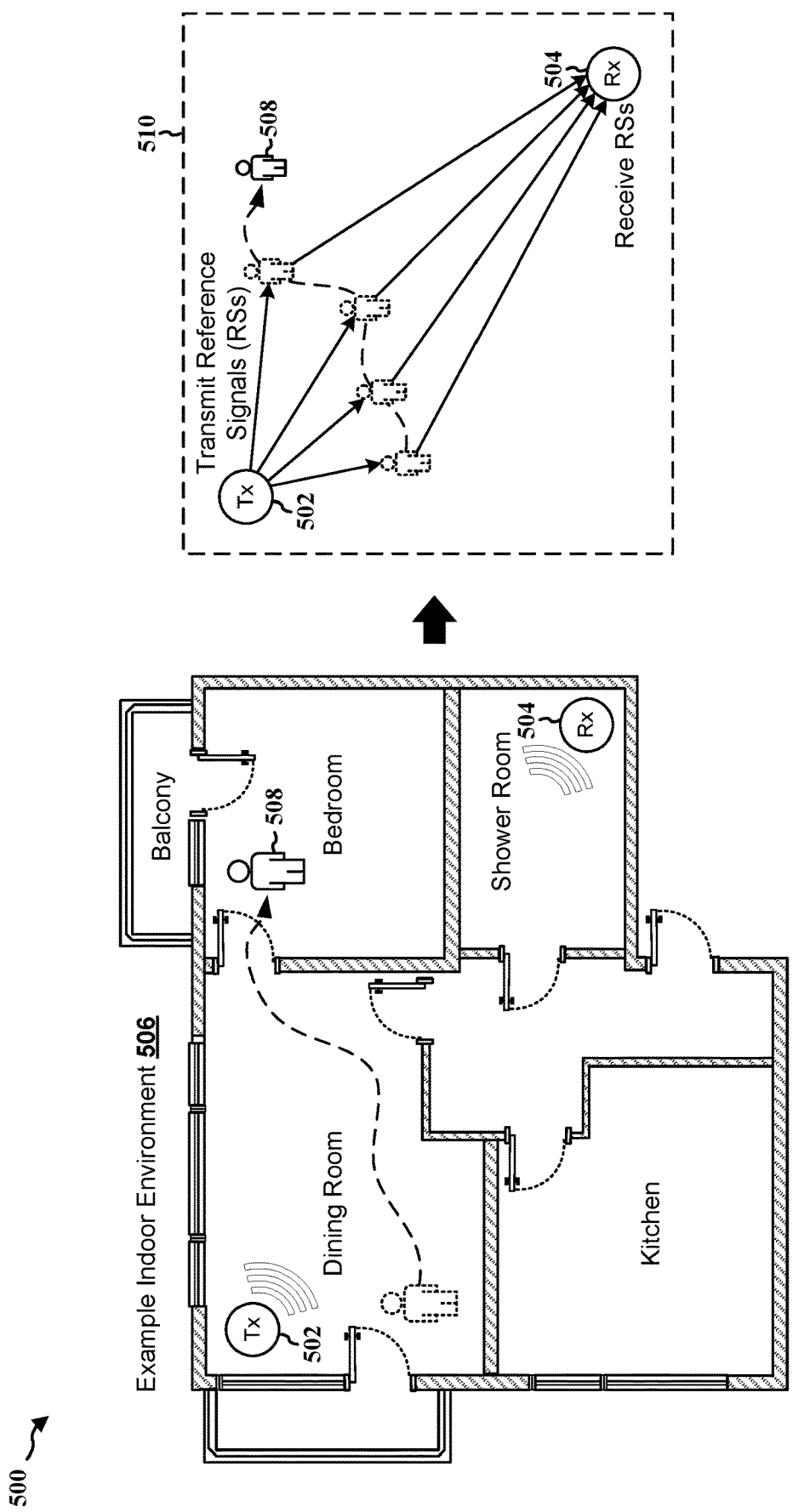
FIG. 5 is a diagram illustrating an example passive localization system in accordance with various aspects of the present disclosure.

FIG. 5 is a diagram 500 illustrating an example passive localization system in accordance with various aspects of the present disclosure. An indoor positioning system, which may include a transmitting (Tx) device 502 and a reception (Rx) device 504, may be placed in an indoor environment 506, where the Tx device 502 may be configured to transmit reference signals and the Rx device 504 may be configured to receive the reference signals. As shown at 510, based on the reference signals reflected from one or more objects, such as from a human 508, the indoor positioning system may identify that the human 508 is presented in the indoor environment 506. For example, while the human 508 is moving across the indoor environment 506 (e.g., from a dining room to a bedroom), reference signals received/measured by the Rx device 504, such as the channel state information (CSI) of the reference signals, may vary based on the location of the human 508. Example indoor positioning systems may include Wi-Fi/Li-Fi access points (APs), Bluetooth beacons and/or ultra-wideband (UWB) beacons, etc.

In some implementations, for an indoor positioning system to identify multiple objects in an indoor environment, the indoor positioning system may be specified/configured to be trained using multi-person annotated data. For example, to enable the indoor positioning system to detect that the indoor environment 506 has four people moving around, the indoor positioning system (or a machine learning (ML)/deep learning (DL) model used by the indoor positioning system) may specify a set of training data associated with four people moving in the indoor environment. In other words, four people may be specified to move around the indoor environment 506 while the indoor positioning system is being trained to detect four people. In some scenarios, the acquisition of this on-site multi-person training data may be difficult, and providing annotations for multi-person positioning may become impractical.

Aspects presented herein may enable a passive positioning system to be trained to identify multiple moving objects based on using training data for a single object. For example, a passive positioning system may be trained to identify a number of people in a defined area (e.g., an indoor environment) based on using a single-person data. In one aspect of the present disclosure, a passive positioning system may be configured to performs people counting in an unsupervised setup. In another aspect of the present disclosure, the passive positioning system may further be configured to perform room classification and precise positioning (e.g., identifying that a person is in a specified area) if the single-person data is also associated with room labels. Aspects presented herein also provided an improved ML/DL approach to passive positioning, such as passive Wi-Fi/Bluetooth/UWB positioning (collectively as "RF positioning" or "passive RF positioning"), where moving object(s), including humans or animals, may be localized on a given two-dimensional (2D) and/or three-dimensional (3D) map by processing the Wi-Fi/Bluetooth/UWB communication channel (collectively as RF communication channel) measured by one or several access points and using deep learning methods and source separation technique.

Figure 6:
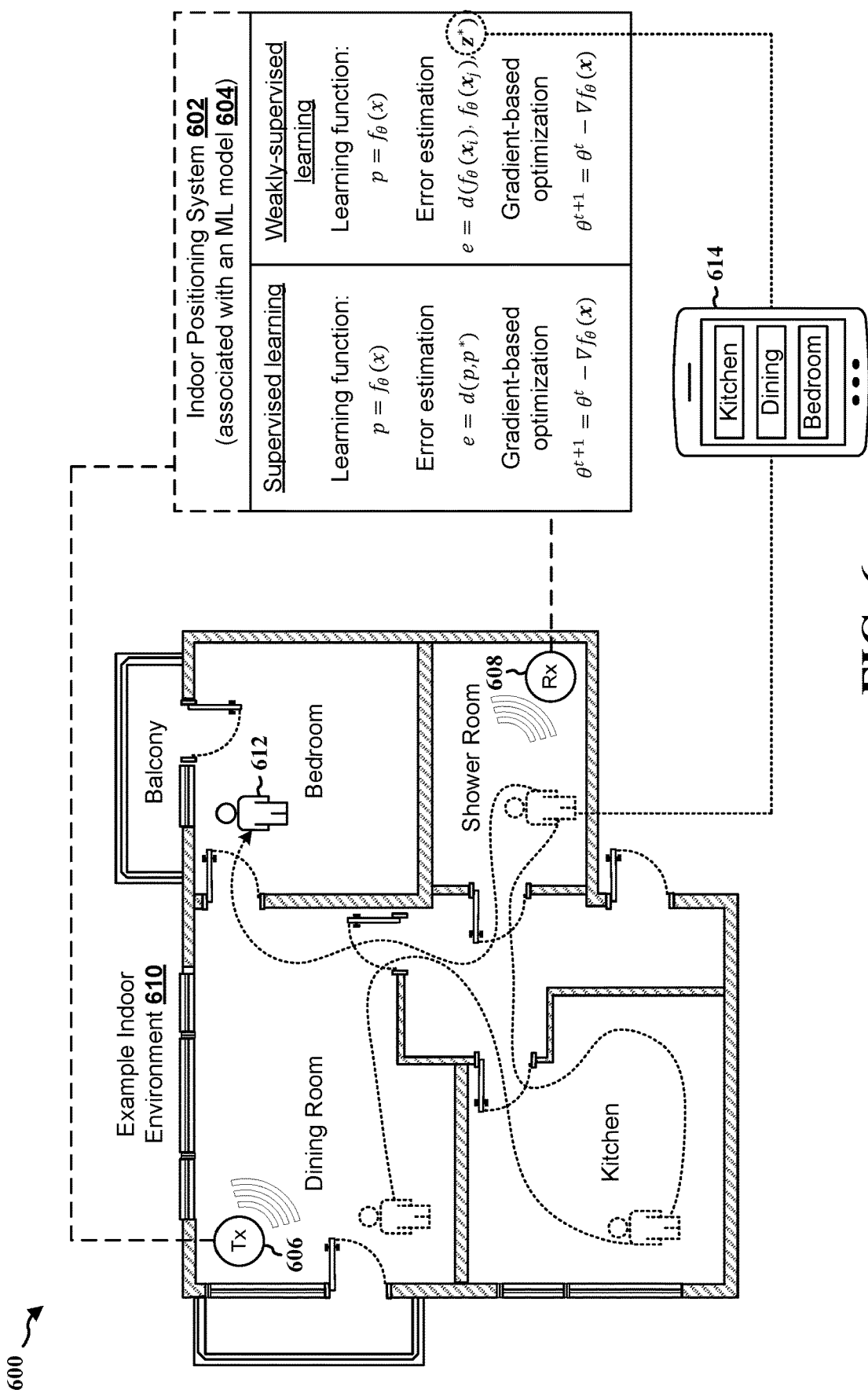
FIG. 6 is a diagram illustrating an example machine learning formulation/training for single-person passive radio frequency (RF) positioning in accordance with various aspects of the present disclosure.

FIG. 6 is a diagram 600 illustrating an example machine learning formulation/training for single-person passive RF positioning in accordance with various aspects of the present disclosure. While aspects of the present disclosure are illustrated with a person and an RF channel, they are merely for illustrations. Aspects presented herein may also apply to detecting object(s) other than human, such as animals and/or other moving (and non-living) objects. Also, various types of RF channel(s) may be used for training the ML model and for detecting the moving objects, which may include Wi-Fi channel, Bluetooth channel, UWB channel, and/or other types of wireless technologies associated with 4G LTE, 5G, 6G, etc. The term "RF channel" may also be referred to and used interchangeably with the term "wireless channel."

In one aspect of the present disclosure, an indoor positioning system 602 may be associated with an ML model 604 that is configured to perform passive RF positioning. For example, the indoor positioning system 602 may include at least one Tx device 606 (e.g., an RF transmitter) and at least one Rx device 608 (e.g., an RF receiver) that are placed in an indoor environment 610. To detect for moving object(s) in the indoor environment 610, the Tx device 606 may be configured to transmit RF signals, and the Rx device 608 may be configured to receive the RF signals transmitted from the Tx device 606. Based on the RF signal received/measured by the Rx device 608, which may be referred to as RF channel data that includes a set of CSI samples, the ML model 604 may be trained to identify whether there are any moving objects in the indoor environment 610 and a number of moving objects in the indoor environment 610, etc. In some examples, the indoor positioning system 602 may be a network entity such as a location server, an LMF, a base station, or a server. In other examples, the indoor positioning system 602 may be a network node or a specified device, such as a UE or a set of UEs.

In one example, to train the ML model 604 for identifying moving object(s) in the indoor environment 610, the indoor positioning system 602 may record the RF channel data (e.g., received by the Rx device 608) while a person 612 is moving around in the indoor environment 610 (for a period of time or during the training of the ML model 604). The training of the ML model 604 may be based on a supervised learning and a weakly-supervised learning.

Under the supervised learning, the training of the ML model 604 may be based on $p=f_\theta(x)$, where x may represent the RF signal recorded by the indoor positioning system 602 and is used as the input for the ML model 604, $f_\theta(\ )$ may represent the learning function that process the RF signal (e.g., x) (θ being the parameter(s) for the ML model 604), and p may represent the estimated/predicted position of the person 612 (e.g., which may be a 2D coordinate or a 3D coordinate of the person 612 on a map). In other words, the learning function $f_\theta$ may provide a mapping between the measured RF channel (CSI) and the location (p) of a moving target (e.g., the person 612) in an arbitrary 2D or 3D coordinate system.

The ML model 604 may adapt or optimize the learning function based on using error estimation and gradient-based optimization. For example, if p represents the estimated (or predicted) location of the person 612 at a time instance (or at a timestamp) on a map (e.g., the indoor environment 610), the error estimation for the ML model 604 (or the learning function) may be based on $e=d(p, p^*)$, where e is the error estimation, $p^*$ is the true location of the person 612, and $d(\ )$ is a distance function that compares the estimated location p of the person 612 with the true location $p^*$ of the person 612 and generates the error estimation e. Then, the learning function may be optimized based on a gradient-based optimization: $\theta^{t+1}=\theta^t-\nabla f_\theta(x)$, where gradient descent of the learning function with respect to the input (e.g., $\nabla f_\theta(x)$) may be computed and used for optimizing the parameter(s) θ for the ML model 604. This process may be repeated for multiple times until the parameters of the ML model 604 (or the learning function) is optimized (e.g., reaching certain accuracy threshold). Once the parameters of the ML model 604 is optimized, the ML model 604 may be able to accurately identify the location of the person 612 in the indoor environment 610.

Under the supervised learning, as the distance function (d) measures the prediction error by comparing it against the true (known) position ($p^*$) of the person 612, this learning mechanism may not be a practical method to train the ML model 604 as the on-site 2D/3D coordinate annotations (e.g., the actual location $p^*$) of the person 612 is specified for the training. In other words, the actual locations of the person 612 are expected to be provided to the ML model 604 during the supervised training, which may be burdensome or difficult to achieve.

In one aspect of the present disclosure, the training of the ML model 604 may be based on the weakly-supervised learning, which may be easier to achieve compared to the supervised learning. Under the weakly-supervised learning, the person 612 may be specified to provide his/her location (e.g., a coarse location) while the person 612 is moving around the indoor environment (and while the indoor positioning system 602 is recording the RF channel data). For example, when the person 612 enters the kitchen, the person 612 may indicate to the indoor positioning system 602 that he/she in the kitchen. Similarly, when the person 612 enters the shower room, the person 612 may indicate to the indoor positioning system 602 that he/she in the shower room, and so on. The person 612 may repeat this process until the RF channel data with the person 612 in different rooms (e.g., in all rooms) is collected/recorded by the indoor positioning system 602.

In one example, the person 612 may provide his/her location using a mobile application (e.g., using a UE). For example, as shown at 614, a mobile application may include a list of pre-defined locations (or a list of locations customized by a user), such as kitchen, dining room, and bedroom, etc. Then, the person 612 may indicate his/her location (e.g., which room is the person 612 at) to the indoor positioning system 602 by pressing the corresponding button/option while moving around the indoor environment 610. For example, when the person 612 is in a bedroom, the person may press the "bedroom" button/option on the mobile application to inform the indoor positioning system 602 that he/she is in the bedroom. Then, the indoor positioning system 602 may record and associate the RF channel data with the provided locations of the user (e.g., the corresponding RF channel data may be annotated with locations of the person 612).

Under the weakly-supervised learning, the training of the ML model 604 may also be based on $p=f_\theta(x)$, where x may represent the RF signal recorded by the indoor positioning system 602 and is used as the input for the ML model 604, $f_\theta()$ may represent the learning function that process the RF signal (e.g., x) (θ being the parameter(s) for the ML model 604), and p may represent the estimated/predicted position of the person 612. However, instead of comparing the estimated/predicted position of the person 612 with the actual position of the person 612 (which may also be referred to as the ground truth location of the person 612), the error estimation for the ML model 604 (or for the learning function) may be based on $e=d(f_\theta(x_i), f_\theta(x_j), z^*)$, where e may represent the error estimation, $f_\theta(x_i)$ may represent a first estimated/predicted location of the person 612 at a first timestamp (e.g., a first point in time), $f_\theta(x_j)$ may represent a second estimated/predicted location of the person 612 at a second timestamp (e.g., a second point in time), z* may represent a coarse label (e.g., the room index) of the person 612 (e.g., provided by the user via the mobile application), and d( ) may represent a distance function that compares the output of the function for two different input (e.g., $x_i$ and $x_j$) with the involvement of the coarse label z*. In other words, based on the designed framework, the distance function may compare the representation of pair-wise samples under the learning function $f_\theta$ transformation and optimize the parameter(s) of mapping to satisfy some constraints that are applied by the distance function d measure.

Similarly, the learning function may be optimized based on the gradient-based optimization: $\theta^{t+1}=\theta^t-\nabla f_\theta(x)$, where gradient descent of the learning function with respect to the input (e.g., $\nabla f_\theta(x)$) may be computed and used for optimizing the parameter(s) θ for the ML model 604. This process may be repeated for multiple times until the parameters of the ML model 604 (or the learning function) is optimized (e.g., reaching certain accuracy threshold). Once the parameters of the ML model 604 is optimized, the ML model 604 may be able to identify the coarse location of the person 612 in the indoor environment 610 (e.g., identify which room is the person 612 at). For purposes of the present disclosure, such learning mechanism may be referred to as a weakly-supervised learning because coarse locations/labels of the person 612 is used for the training instead of the accurate/ground truth locations/labels of the person 612. Thus, a set of coarse labels like room-level positions (z*) may be specified for supervision (e.g., for training the ML model 604).

In another aspect of the present disclosure, the machine learning formulation/training may also be configured for a multi-person passive RF positioning system, where the multi-person passive RF positioning system may be able to identify multiple moving objects in a given area and the locations of the multiple moving object. In one example, to train the multi-person passive RF positioning system, the training of the ML model may specify multiple objects (e.g., multiple people) to move around the indoor environment during the ML model training. For example, for multi-person passive RF positioning, the machine learning formulation may be based on: $P^*=\{p_1, \ldots, p_n\}$ and $P=f_\theta(x)$. Instead of having one ground truth for each input x, there may be a set of positions for each input x. In other words, instead of predicting one 2D/3D coordinate for each input, multiple 2D/3D coordinates are predicted for each input because there are multiple targets in the indoor environment. Thus, the ground truth locations of the objects P* may include a set of predicted positions $\{p_1, \ldots, p_n\}$. After the ground truth locations of the objects are obtained, the learning function may be optimized using the error estimation (e.g., $e=d(p, p^*)$) and the gradient-based optimization (e.g., $\theta^{t+1}=\theta^t-\nabla f_\theta(x)$), such as described in connection with FIG. 6. Similarly, this process may be repeated for multiple times until the parameters of the ML model (or the learning function) is optimized (e.g., reaching certain accuracy threshold).

In multi-person and supervised learning case, the predicted positions may be a set of vectors, where each vector may represent the position of one target. Thus, the distance function d( ) may be configured to support distance between two sets of vectors while the correspondences are unknown. In some examples, Chamfer and Hausdorff distances may be used by an ML model as the distance function. Similar to the supervised learning for single-person passive positioning described in connection with FIG. 6, providing on-site multi-target positional annotation may be impractical and difficult. For example, to train an ML model to detect five people in a given environment, the training data may specify five people to walk around the given environment and provide their ground truth locations (e.g., their 2D/3D coordinates on a map) while the ML model is recording the RF channel data.

In another aspect of the present disclosure, the machine learning formulation/training for a multi-person passive RF positioning system may also be based on weakly-supervised learning by utilizing compositional modeling and analysis by synthesize.

Figure 7:
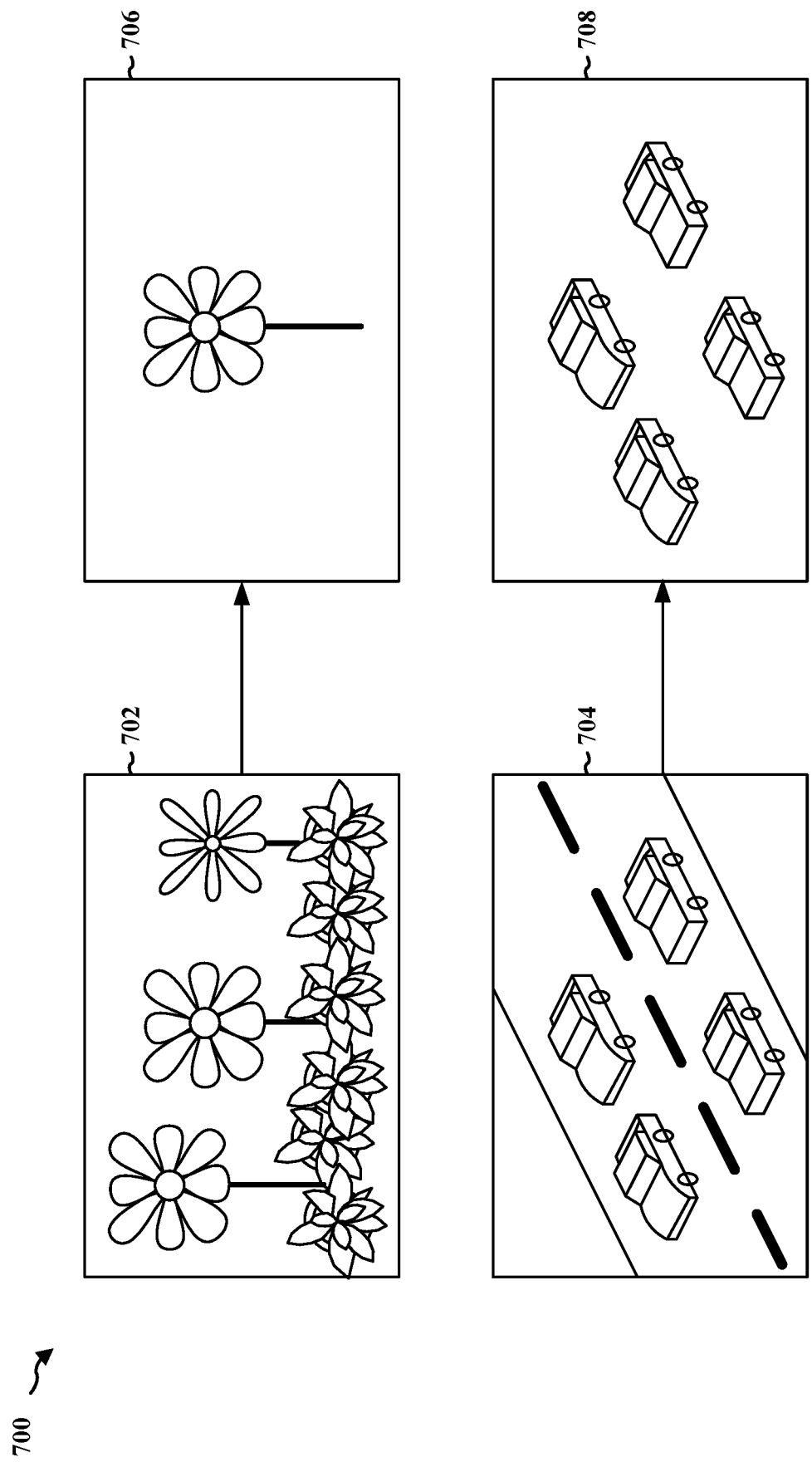
FIG. 7 is a diagram illustrating an example compositional modeling in accordance with various aspects of the present disclosure.

FIG. 7 is a diagram 700 illustrating an example compositional modeling in accordance with various aspects of the present disclosure. In one example, compositional modeling may refer to a model or algorithm that enables complex data to be represented with a finite set of primitives across many scenarios by recombining them to produce an exponentially large number of novel yet coherent and potentially useful concepts.

For example, as shown at 702, an image may include a plurality of flowers and grasses, or as shown at 704, an image may include a plurality of cars travelling on a highway. The images shown at 702 and 704 may include some finite sets of objects, such as a set of flowers, a set of grasses, or a set of cars, etc. One goal of the compositional modeling is to try to simplify a complex data by decomposing it to some base elements or base objects. For example, to analyze or identify the species of the flowers in the image shown at 702, if the flowers are identical and belong to the same species, a compositional modeling may turn the complex image to a simpler image, where the simpler image may include just one flower as shown at 706 (which may be easier to be processed by a processor compared to the original image). In another example, to analyze or identify how many cars are in the image shown at 704, a compositional modeling may turn the complex image to a simpler image by removing irrelevant backgrounds (e.g., lanes on the highway) from the image, such that the simpler image may include just cars such as shown at 708 (which may also be easier to be processed by a processor compared to the original image).

Analysis by synthesis may refer to a process that aims to analyze a signal or an image by reproducing it using a model. Being aware of the characteristics of the generated data, a computational model may be design for analysis of the data. The objective may be to find the value of the model parameters that synthesize the closest image possible in the span of the model. In some scenarios, a set of data may be easier to analyze if the set of data is being synthesized. For example, once a set of data is synthesized, parameters associated with the set of data may be manipulated using specified models.

Figure 8:
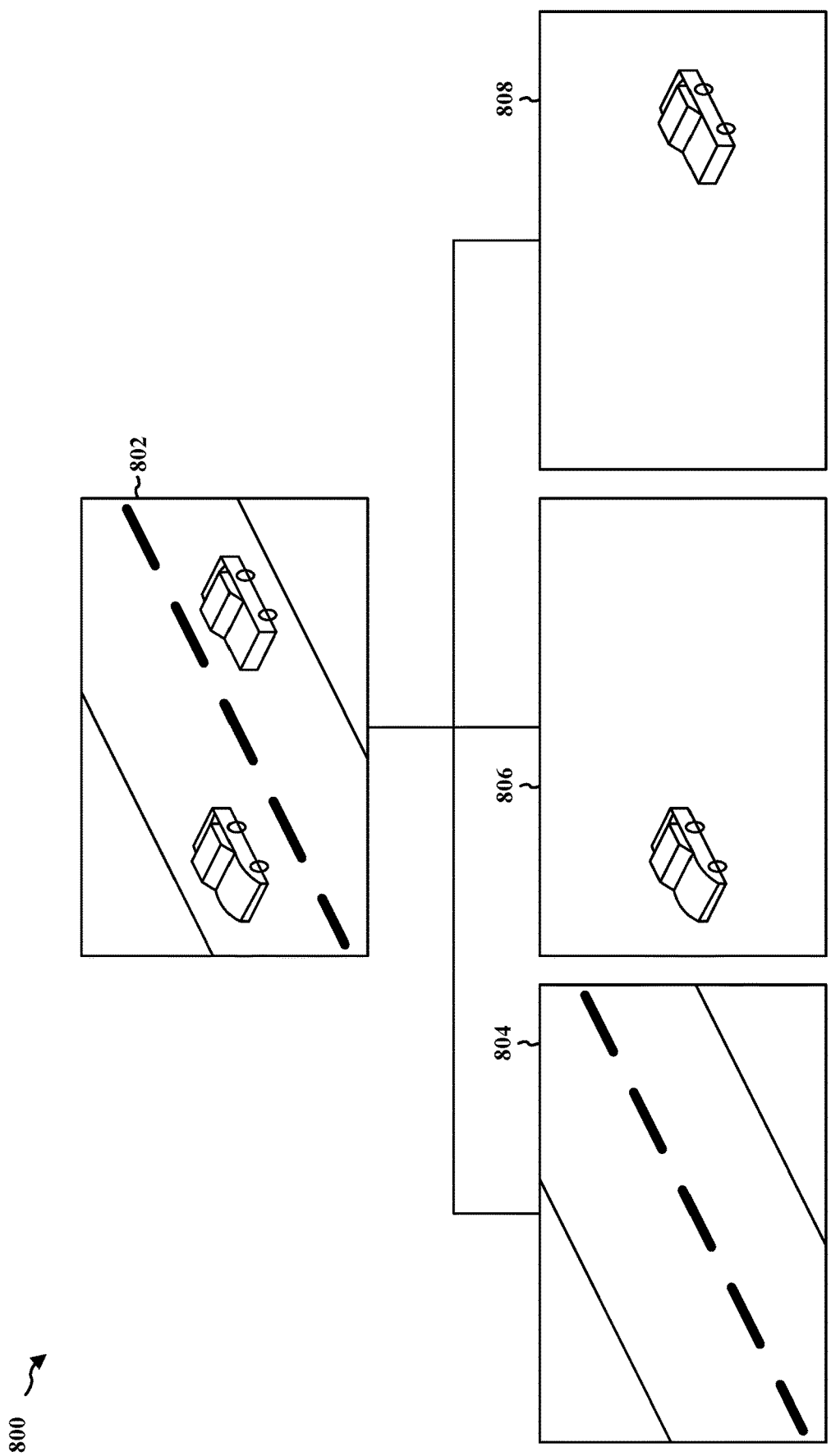
FIG. 8 is a diagram illustrating an example of (de) compositional modeling of a vision data in accordance with various aspects of the present disclosure.

FIG. 8 is a diagram 800 illustrating an example of (de)compositional modeling of a vision data in accordance with various aspects of the present disclosure. In one example, a model may be configured to predict/identify the coordinates (e.g., the X-Y position) of cars in an image. As shown at 802, the image may include multiple cars and background (e.g., two cars travelling on a highway), which may not be easy for the model to process the image and perform the prediction. Thus, instead of analyzing the image shown at 802 directly (or as a whole), the model may first decompose that image into multiple images, where each image may include just one object/feature. For example, the model may decompose the image into three images, where the first image may include just the highway as shown at 804, the second image may include just a first car as shown at 806, and the third image may include just a second car as shown at 808. After the image is decomposed, the model may perform prediction for each image. For example, the model may predict that the first image does not have a car, the second image include a car at a first X-Y coordinate, and the third image include a car at a second X-Y coordinate, etc. After a prediction is performed for each image, the model may synthesize (e.g., aggregate) the predictions to obtain the final prediction (e.g., that there are two cars at the first and second X-Y coordinates). As such, the model may be able to generate a prediction for a complex data based on this (de)compositional modeling and analysis by synthesis.

As described in connection with FIG. 6, for single-person passive RF positioning, an ML model (e.g., the ML model 604) may be trained based on a weakly-supervised learning where coarse location (e.g., room label/index) of the person is recorded by the positioning system (e.g., the indoor positioning system 602) instead of the ground truth location (e.g., the exact 2D/3D coordinates) of the person. Similarly, in one aspect of the present disclosure, the training of an ML model for the multi-person passive RF positioning may also be based on a weakly-supervised learning using coarse location of just one person. For example, a person (or an object) may move around an indoor environment and provide his/her coarse locations (e.g., room locations) while a positioning system is recording the RF channel (e.g., used for training its ML model).

Figure 9A:
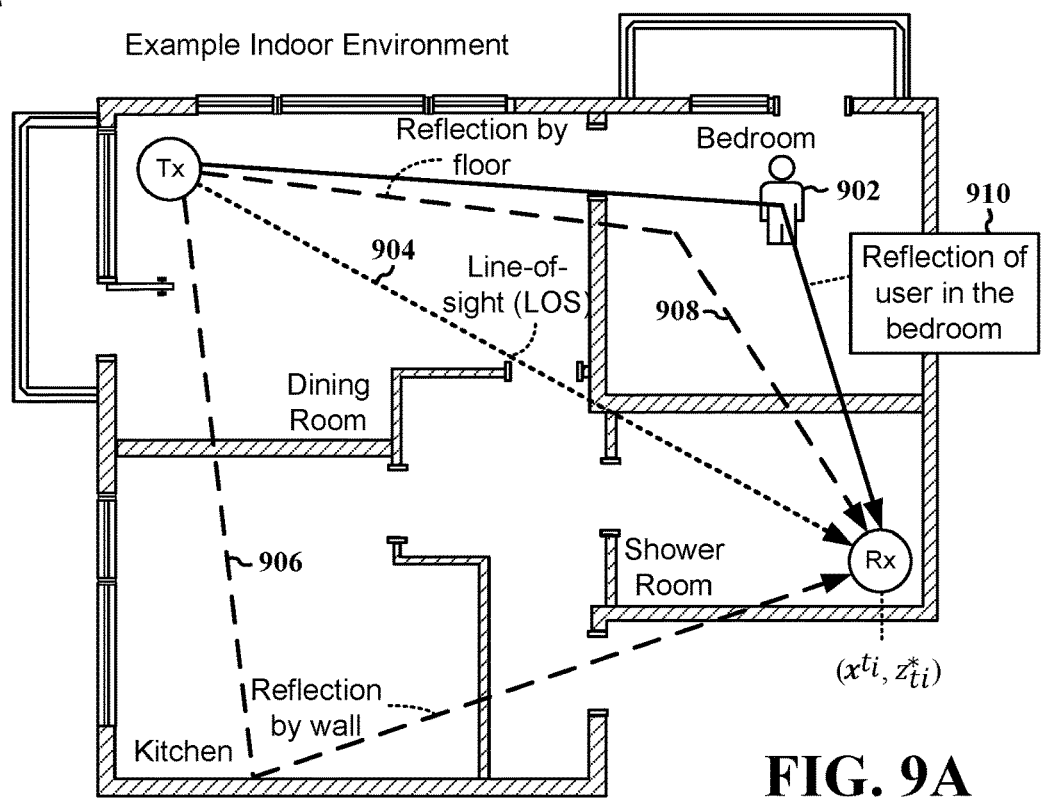
FIG. 9A is a diagram illustrating an example of recording RF channel data while a person is in different room in accordance with various aspects of the present disclosure.
Figure 9B:
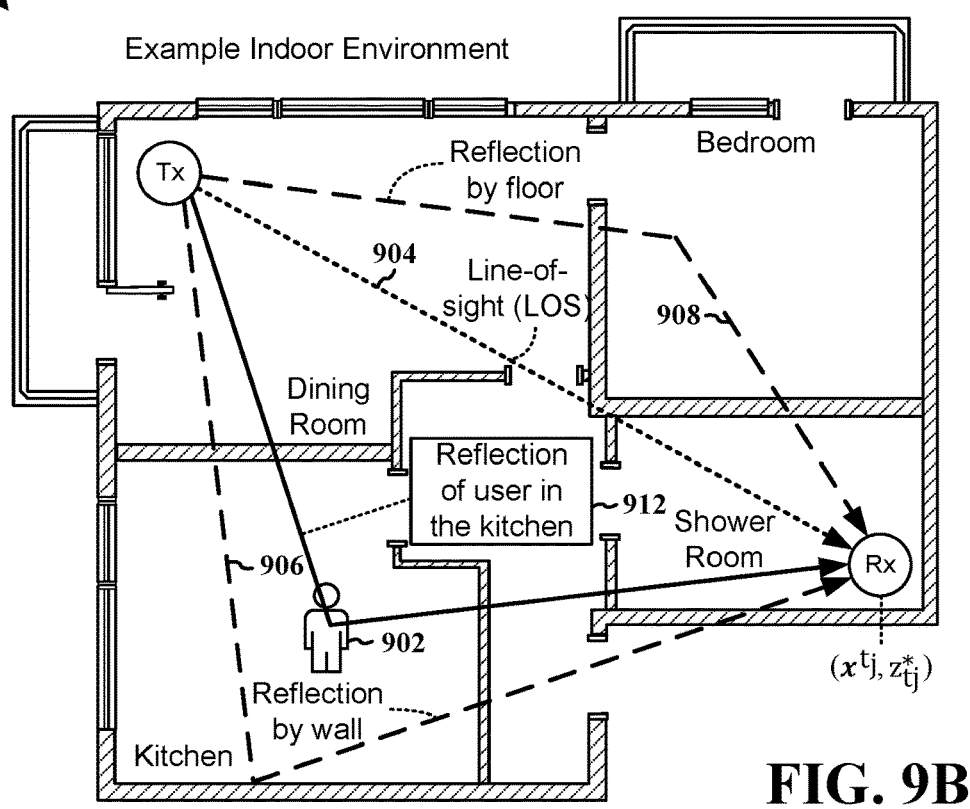
FIG. 9B is a diagram illustrating an example of recording RF channel data while a person is in different room in accordance with various aspects of the present disclosure.

FIGS. 9A and 9B are diagrams 900A and 900B illustrating an example of recording RF channel data while a person is in different room in accordance with various aspects of the present disclosure. As shown by the diagram 900A of FIG. 9A, when an indoor positioning system (or its ML model) records the RF channel data while a person 902 is in a bedroom, the RF channel data may include RF signals transmitted from a Tx device and received by an Rx device via different (and multiple) paths. For example, as shown at 904, the RF signals may propagate to the Rx device via a line-of-sight (LOS) path. As shown at 906 and 908, the RF signals may also propagate to the Rx device after reflecting from a wall and/or from a floor. As shown at 910, the RF signals may also propagate to the Rx device after reflecting from the person 902 while the person is in the bedroom. Similarly, as shown by the diagram 900B of FIG. 9B, when the indoor positioning system (or its ML model) records the RF channel data while the person 902 is in a kitchen, the RF signals may propagate to the Rx device via an LOS path as shown at 904, via a reflection path from a wall as shown at 906, via a reflection path from a floor as shown at 908, and via a reflection path from the person 902 while the person is in the kitchen as shown at 912.

Figure 10:
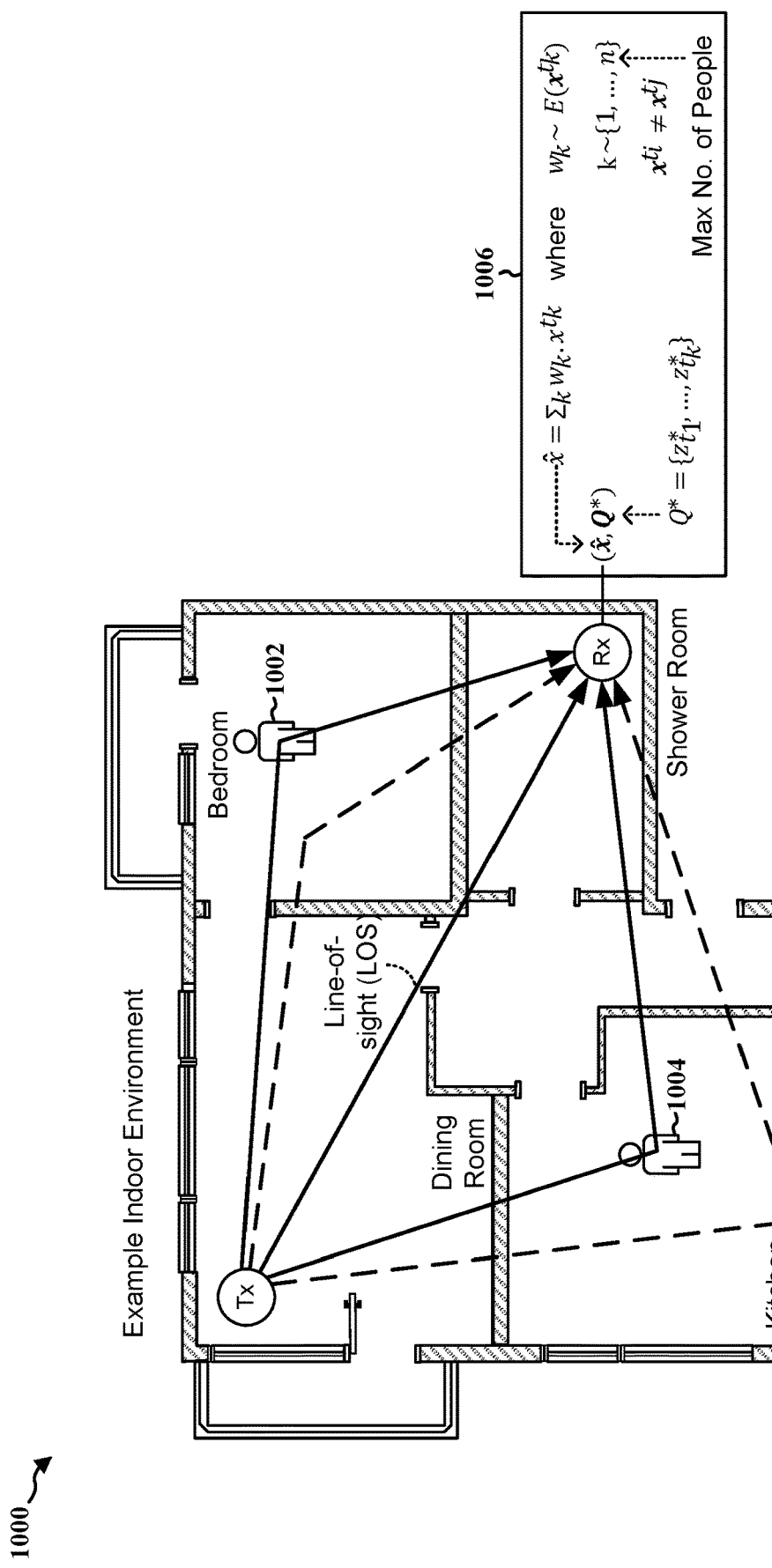
FIG. 10 is a diagram illustrating an example multi-person passive RF positioning in accordance with various aspects of the present disclosure.

FIG. 10 is a diagram 1000 illustrating an example multi-person passive RF positioning in accordance with various aspects of the present disclosure. Based on the training data generated from a person moving around an indoor environment as described in connection with FIGS. 9A and 9B, the training data may be used for identifying multi-person in the indoor environment. For example, if a first person 1002 is in the bedroom and a second person 1004 is in the kitchen (e.g., at exact or approximate locations of the bedroom/kitchen), the RF channel data recorded by the indoor positioning system may be similar to a superposition (e.g., a composition) of the RF channel data recorded when a single user is in the bedroom (as shown by FIG. 9A) and the RF channel data recorded when a single user is in the kitchen (as shown by FIG. 9B). In other words, the RF channel data may include RF signals propagate from the Tx device to the Rx device via (1) a LOS path, (2) a reflection path from a wall, (3) a reflection path from a floor, (4) a reflection path from a person in the bedroom, and (5) a reflection path from a person in the kitchen.

In one aspect of the present disclosure, the compositional modeling described in connection with FIGS. 7 and 8 may be used for processing the RF channel data. For example, as described in connection with FIGS. 6, 9A, and 9B, an indoor positioning system may be configured to measure the RF channel/signals while a single person is traversing a defined area (e.g., an indoor environment). While the person is visiting/traversing different rooms/zones, the person may record/indicate the indices/label of room/zone that he/she presents, such as by using a mobile application. In response, the indoor positioning system may associate the recorded/indicated room indices with the collected RF channel data samples, such as based on the registered time. For example, RF channel data recorded at a first period of time where the person is in the bedroom will be labelled with "bedroom," and RF channel data recorded at a second period of time where the person is in the kitchen will be labelled with "kitchen," etc. This may be the last step for collecting training data for the indoor positioning system.

For training the ML model of the indoor positioning system, two samples from the set of recorded RF channel data may be randomly selected and their weighted sum may be computed (e.g., based on their signal power) using $$\hat{x} = \sum_k w_k \cdot x'^k,$$

where $\hat{x}$ may represent the synthesized version (e.g., not measured) of the RF channel data based on the weighted sum of real RF channel data $x'^k$ (e.g., the single-person RF channel data recorded in FIGS. 9A and 9B), and $w_k$ may represent the corresponding weight for the real RF channel data $x^{t_x}$.

In some examples, the weighting for the real RF channel data $x^{t_k}$ may be based on the power of the signal, e.g., $w_k \sim E(x^{t_k})$. For example, when a person is closer to an Rx device and/or is in a LOS path with the Rx device, the signal power may be higher compared to the person is in a non-line-of-sight (NLOS) path and/or farther away from the Rx device or in an elliptical distance from the Rx device and the Tx device. Thus, higher signal power may be assigned with a higher weight and lower signal power may be assigned with a lower weight. Based on the assigned weight, two signals may be combined into one signal, where this computed superposed signal may emulate the two-persons RF signal.

Similarly, to generate RF data for N persons (e.g., 3 persons, 5 persons, etc.), N samples from the set of recorded RF channel data may be randomly selected and their weighted sum may be computed using $$\hat{x} = \sum_k w_k \cdot x^{t_k}.$$

Then, as the locations of the person is known (e.g., provided by the person while the person is traversing the indoor environment), the generated RF data $\hat{x}$ may be associated with its corresponding room indices/labels based on $(\hat{x}, Q^*)$ where $Q^* = \{z_{t_1}^*, \ldots, z_{t_k}^*\}$ (e.g., a set of indices/labels).

As discussed in connection with FIG. 6, as supervised learning may be impractical in many scenarios, the ML model (or formulation) for multi-person RF positioning may be based on the weakly-supervised learning and use training data associated with a single person. For example, instead of training the ML model using the ground truth location of the person based on $P=f_\theta(x)$ (e.g., x being the real training data), the ML model may be trained using generated RF channel data based on $Q=f_\theta(\hat{x})$, where $\hat{x}$ may represent the generated data and Q may represent the predicted location(s) (of objects) based on the generated data (e.g., $P=f_\theta(x) \to Q=\theta_\theta$ ($\hat{x}$) with similar distributions $p_x \approx p_{\hat{x}}$). As discussed above, for generating multi-person sample ($\hat{x}$), just single-person samples may be specified. The generated data may include RF channel (CSI) and its associated annotations.

Similarly, the ML model or the learning function may be optimized based on error estimation and gradient-based optimization. For example, the error estimation for the ML model may be based on $e=d(Q, Q^*)$, where e may represent the error estimation, Q may represent the prediction (e.g., estimated locations of people in the indoor environment), and $Q^*$ may represent the generated coordinates (e.g., aggregation of the single-person annotation or labels), and $d(\ )$ may represent a distance function that compares the prediction with the generated coordinates. Then, the learning function may be optimized based on a gradient-based optimization: $\theta^{j+1}=\theta^j-\nabla f_\theta(\hat{x})$, where gradient descent of the learning function with respect to the input (e.g., $\nabla f_\theta(\hat{x})$) may be computed and used for optimizing the parameter(s) $\theta$ for the ML model. This process may be repeated for multiple times until the parameters of the ML model (or the learning function) is optimized (e.g., reaching certain accuracy threshold).

To generate a valid ($\hat{x}$, $Q^*$) collection that enables the learning function ($f_\theta$) to show a low error on x inputs, a single-person training data may be used instead of multi-person training data. For example, a collected multi-person database X may be represented by $X=\{X^{(1)}, X^{(2)}, \ldots X^{(n)}\}$, where $X^{(1)}$ may represent the training data for a single person, $X^{(2)}$ may represent the training data for two people, and $X^{(n)}$ may represent the training data for n people, etc. However, as aspects presented herein enables the ML model to be trained with a single-person data, just $X^{(1)}$ (e.g., the single-person data) may be specified to be associated with room indices/labels ($p^*$). Then, an assembled/synthesized multi-person training dataset $\hat{X}$ may be generated based on $\hat{X}=\{\hat{X}^{(1)}, \hat{X}^{(2)}, \ldots, \hat{X}^{(n)}\}$, where $X^{(1)}$ may represent the training data for a single person, and $\hat{X}^{(2)}, \ldots, \hat{X}^{(n)}$ may be generated training data based on $$\hat{x}^{(k)} = \sum_k w_k \cdot x_{t_k}^{(1)} \text{ and } Q^{*(k)} = \{z_{t_1}^*, \ldots, z_{t_k}^*\},$$

such as described in connection with FIG. 10.

Figure 11:
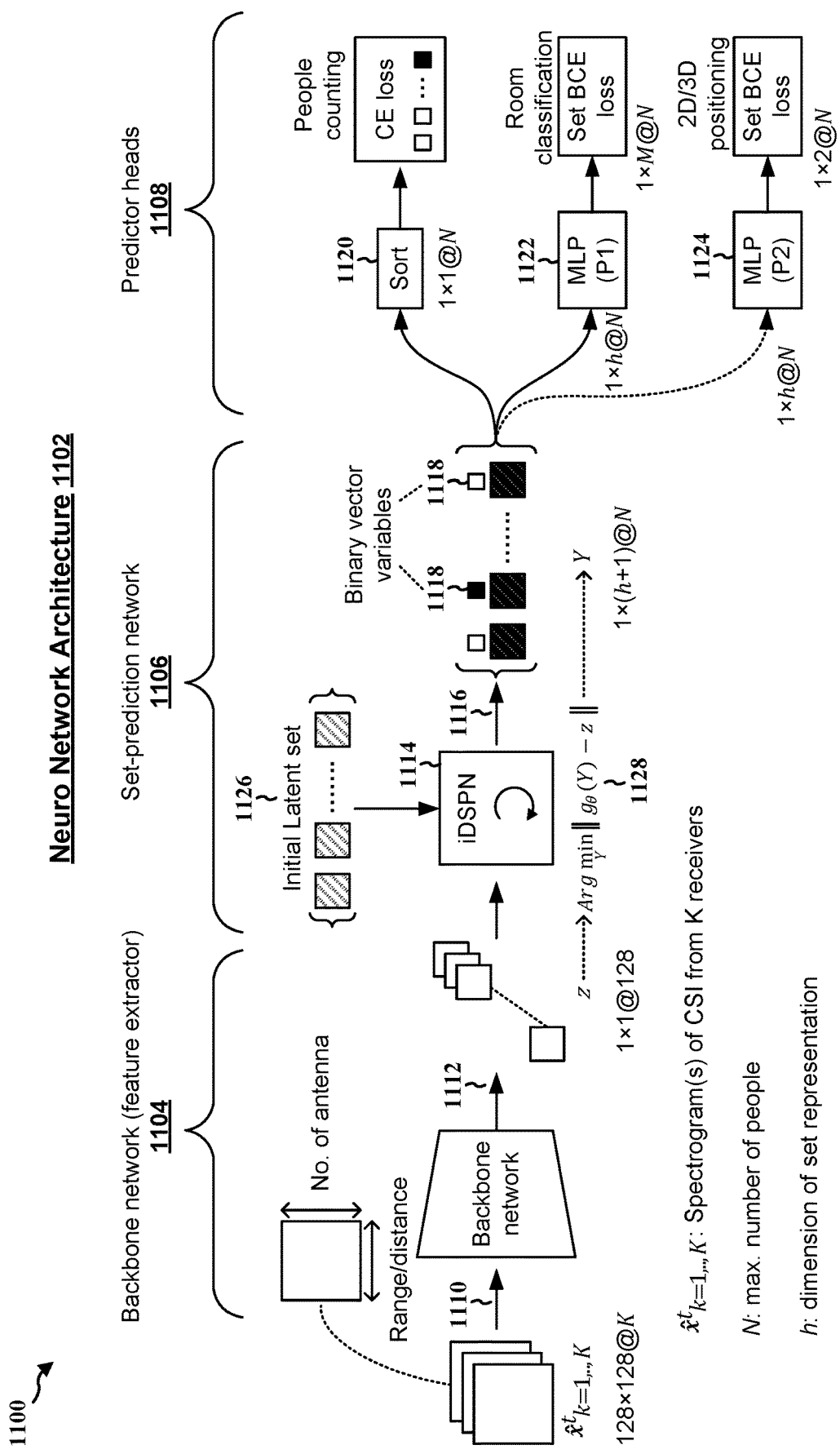
FIG. 11 is a diagram illustrating an example neural network architecture that may be used by a machine learning (ML) model for performing predictions for the multi-person passive positioning system in accordance with various aspects of the present disclosure.

FIG. 11 is a diagram 1100 illustrating an example neural network architecture that may be used by an ML model for performing predictions for the multi-person passive positioning system in accordance with various aspects of the present disclosure. In one example, a neural network architecture 1102 may include three parts, a backbone network 1104, a set-prediction network 1106, and predictor head(s) 1108.

The backbone network 1104 may serve as a feature extractor. For example, as shown at 1110, the backbone network 1104 may receive the CSI tensor of one or multiple Rx devices and map it into a lower dimensional vector (z). The CSI tensor may be a spectrogram converted from the RF channel data based on a fast-Fourier transformation (FFT), which may be an image-like input with one axis representing a range or a distance and another axis representing a number of antennas, etc. In some scenarios, there may be multiple spectrograms when there are multiple receivers (e.g., multiple Rx devices), where each receiver may provide one spectrogram. The spectrograms may be concatenated or catenated in the channel and pass to the backbone network 1104, and the backbone network 1104 may generate a set of features by compressing the information or by compressing the dimensionality of the input signal to a lower dimension. For example, as shown at 1112, the backbone network 1104 may convert an image of 128 by 128 pixels into a vector of 128 elements or dimensions.

The set-prediction network 1106 may be configured to decompose the "z" vector from the backbone network 1104 and decompose it into a set of object representation vectors, where the decomposition may be performed by an implicit deep set prediction network (iDSPN) module, such as shown at 1114. For example, as shown at 1116, the set-prediction network 1106 may receive a vector (e.g., the vector of 128 elements or dimensions) from the backbone network 1104 and decompose the vector into a set of object vectors. As an illustration, if the maximum number of people who may exist in the data is ten (10), the set-prediction network 1106 may decompose the vector from the backbone network 1104 to a set of ten object vectors, such as shown at 1116. Each object vector may be binary, or may be associated with a binary variable. For example, as shown at 1118, the binary variables may be represented using a black color and a white color, or represented with the value zero (0) or one (1), etc.

The binary variables may be used for indicating whether an associated object vector is valid or invalid. For example, if there are six (6) people in the indoor environment and the maximum number of people allowed for the data/prediction is ten (10), then six (6) of the ten binary variables (corresponding to the ten object vectors) may be associated with a valid indication (e.g., using the value one (1) or the color black) and four (4) of the ten binary variations may be associated with an invalid indication (e.g., using the value zero (0) or the color white), etc. In other words, the set-prediction network 1106 receives a vector from the backbone network 1104 and covert it to a set of object vectors with predicted binary indicators. The predicted binary indicators produced by the set-prediction network 1106 may be used for predicting the number of people in the indoor environment.

In some examples, as shown at 1114, the iDSPN module that is configured to decompose the vector from the backbone network 1104 may include an iterative inner optimization loop, where the iDSPN module may receive some random vectors from a uniform distribution. By initializing the learnable (latent) set at random, the iDSPN module may try to minimize the difference between representation of the latent set in the hidden space of a multilayer perceptron (MLP) network and the input to the iDSPN module. For example, if the set-prediction network 1106 is configured to decompose the vector from the backbone network 1104 to a set of ten (10) object vectors (e.g., the maximum number of people who may exist in the data is ten (10)), as shown 1126, ten initialized vectors may be randomly selected to pass through the iDSPN module. The iDSPN module may include an internal MLP encoder ge (Y) that receives the ten initialized vectors as Y, and the function ge may be configured to produce what it receives (e.g., if it receives 10 inputs, it also produces 10 outputs). In one example, as shown at 1128, the objective of the iDSPN module may be represented by $$\text{Arg} \min_Y \|g_\theta(Y) - z\|$$

which minimizes difference between z (e.g., the feature vector of backbone network) and Y (e.g., the predicted set of vectors), where θ may represent learning parameters of the set-prediction network 1106.

Depending on whether the generated data includes just room-level annotation or precise 2D/3D coordinates, multiple predictor head(s) 1108 may be used for performing different predictions based on the set of object vectors with predicted binary indicators. For example, as shown at 1120, a first predictor head may be used for detecting a number of people (or performing people counting) in the indoor environment based on the set of object vectors received from the set-prediction network 1106. As shown at 1122 and 1124, two multilayer perceptron (MLP) predictor heads may be used for predicting the room and/or the precise positions of people, respectively, based on the set of object vectors received from the set-prediction network 1106. In one example, the prediction of the room(s) in which the people are located may be based on a binary cross entropy (BCE), and the prediction of the precise positions of the people may be based on mean squared error (MSE).

In another aspect of the present disclosure, a source separation mechanism may be provided based on the indoor positioning system described herein. For purposes of the present disclosure, source separation may refer to the separation of a set of source signals from a set of mixed signals. For example, an audio recording may include four people talking at a same period of time, which means that the audio recording may include a mixture of four sets of sound signals, each set of sound signals may correspond to one of the four people talking. By applying source separation to the audio recording, each set of sound signals may be separated from the mixture of four sets of sound signals. In some scenarios, source separation may be suitable and desirable for certain data modalities such as RF signals, medical imaging (e.g., electroencephalography (EEG), magnetoencephalography (MEG)), etc. By minor modification to the aspects discussed in connection with FIGS. 6 to 11, certain aspects of the present disclosure may be used for performing source separation.

Figure 12:
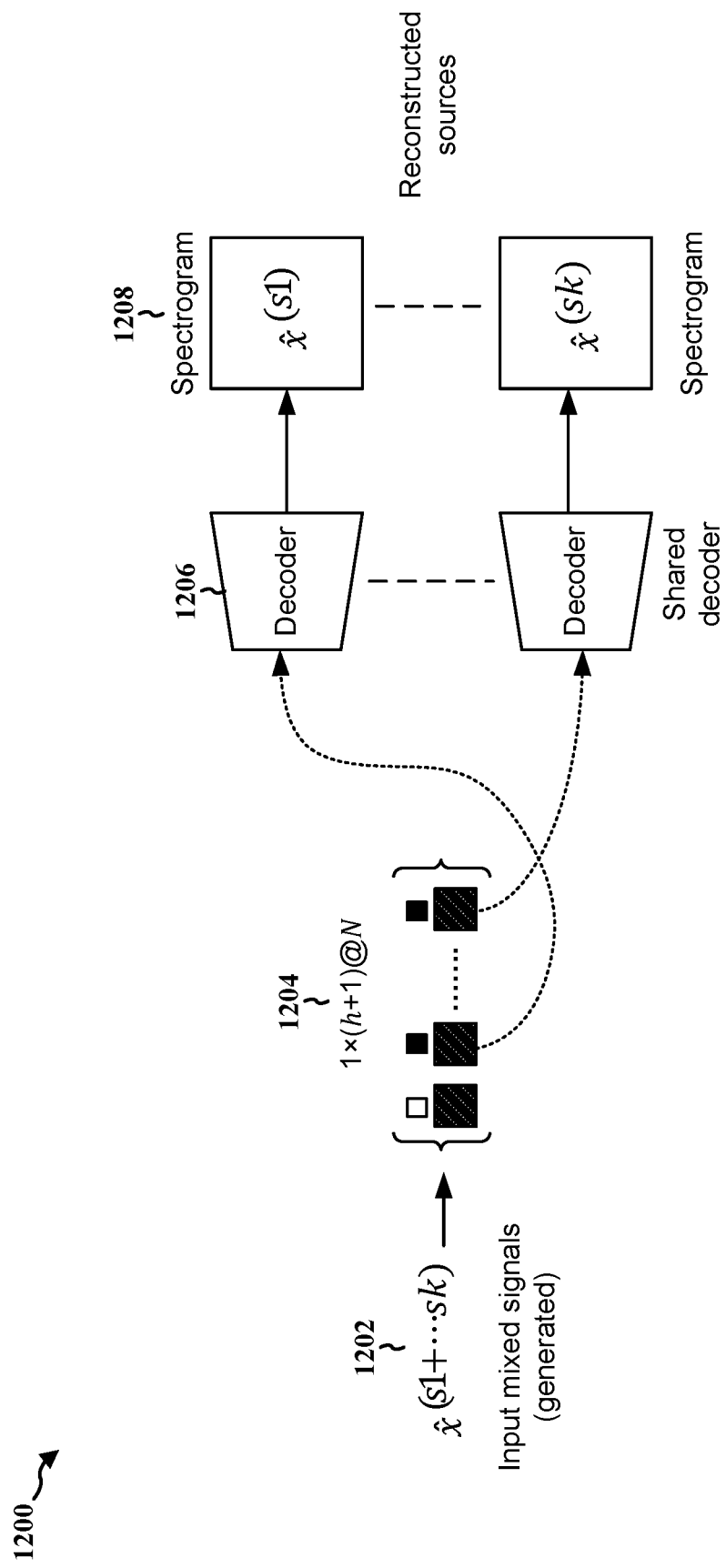
FIG. 12 is a diagram 1200 illustrating an example of performing source separation based on the proposed neural network architecture in accordance with various aspects of the present disclosure.

FIG. 12 is a diagram 1200 illustrating an example of performing source separation based on the proposed neural network architecture in accordance with various aspects of the present disclosure. In one example, as shown at 1202 and 1204, based on the neural network architecture described in connection with FIG. 11 (e.g., neural network architecture 1102), a set of input mixed signals (e.g., generated) may be decomposed into a set of object vectors (associated with binary variables).

As shown at 1206, to perform source separation for the set of input mixed signals, a decoder network (e.g., a set of shared decoders) may be added to the neural network architecture, where the decoder network may receive each object vector (or object representation) from the corresponding set-prediction network (e.g., the set-prediction network 1106) and reconstruct the signal corresponding to that object vector in the training time (e.g., during the ML model training). In the inference time (e.g., during the ML model inferencing/prediction), the set-prediction network may decompose an input vector/representation into a set of individual object vectors/representations and consequently the decoder may reconstruct one signal per object vector/representation in the set. Therefore, the input mixed signal may be decomposed into its sources, such as shown at 1208. For example, if the set of input mixed signals $\hat{x}^{(s1+ \ldots sk)}$ at 1202 corresponds to four people talking, then each output at 1208 may correspond to one of the four people talking (e.g., its corresponding voice signals).

As described in connection with FIGS. 5 to 11, aspects presented herein may enable an indoor passive positioning system (or its associated ML model) to be trained to identify a number of moving objects and their locations (e.g., coarse locations) based on data for a single moving object. In other words, aspects presented herein provide a technique for counting and positioning moving objects, such as counting a number of people in the indoor spaces. The moving objects to be detected (e.g., people, animal, etc.) are not specified to carry any devices (e.g., RF tag, UE, positioning device, etc.) and may move freely through a building with multiple rooms, separated by walls (i.e., non-line of sight situation), such as shown by FIGS. 5, 6, and 10.

As discussed in connection with FIG. 6, as employing supervised learning method(s) for an ML model may specify acquisition of multi-person annotated data, which may be impractical in many scenarios, aspects presented herein may enable an ML model for an indoor positioning system to learn the task (e.g., counting number of people in an indoor environment and/or estimate their locations) when just a single-person annotation is available (e.g., based on a weakly-supervised learning). Aspects presented herein does not specify multi-person data for training an ML model, and the ML model may infer on actual multi-person samples as a zero-shot learning model. In some examples, a zero-shot learning model may refer to a learning model that does not see/receive the samples/examples of the data that is being used for deployment of the learning model. For example, if a set of training data includes images of cat(s) and dog(s), an ML model may be trained to classify them. After the ML model is trained, the ML model may be used to classify the cat images from each other. This learning model may be referred to as a zero-shot learning model because there is zero number of samples/examples in the training set that is being used in a test time or in a deployment time of the ML model. In another example, referred back to FIG. 10, as multi-person data is not used for the ML model training (e.g., a single-person data is used for generating the training data), the ML model may be deployed to perform multi-person positioning without using any multi-person training data hence zero-shot.

In one example, as shown at FIGS. 6, 9A and 9B, single-person data acquisition may be performed while a person is traversing all possible (WiFi-coverage) areas in a defined area (e.g., an indoor environment) and at the same time recording/indicating his zone/room indices, such as using a recording/indicating device like a mobile-phone (e.g., a UE). The recorded RF channel data/samples by the RF devices, which may be installed in the indoor environment as shown by FIGS. 5 and 6, and their associated room labels may provide sufficient (or all) information specified for training the ML model, which enables a more practical and efficient way to train the ML model.

In some scenarios, beside predicting a room in which a moving object is located, if a more precise positioning is specified, 2D/3D single person labels may also be produced by using the developed single-person positioning models. Afterwards, these coordinate labels may be used for training an ML model for precise positioning. After the ML model training, the ML model may infer on the measured RF channel and performs the people counting, room-level, and/or 2D/3D coordinate predictions of multiple or all moving people in the detecting area (e.g., the defined indoor environment).

As described in connection with FIGS. 11 and 12, aspects presented herein may also be used to provide source separation for mixture of signals (e.g., for separating elements/objects/signals in a complex image, audio signal, etc.). Source separation may be a common problem in sound/speech signal processing domain. In general, this problem may also be extended to many other data modalities where an input signal includes the effects of multiple independent sources (e.g., an audio recording with sounds from multiple objects). As discussed in connection with FIG. 12, with a minor modification to the neural network architecture described herein, the modified neural network architecture may be employed for decomposing an input signal when the input signal conveys information of more than one source. Similarly, just the availability of individual source data is specified for the modified neural network architecture, where an ML model may be trained to perform the source separation using single-object data instead of multi-object data. For example, as shown by FIG. 12, the modification (for the source separation) may be based on adding a decoder network to the neural network architecture described in connection with FIG. 11. As a result of this, an ML model may decompose a mixture signal into several signals, where each signal may contain (or may be associated with) just the pattern (e.g., effect) of a single target. In addition, aspects presented herein may be mainly applicable to diverse data modalities since they have no inductive bias towards the data modality in use.

Figure 13:
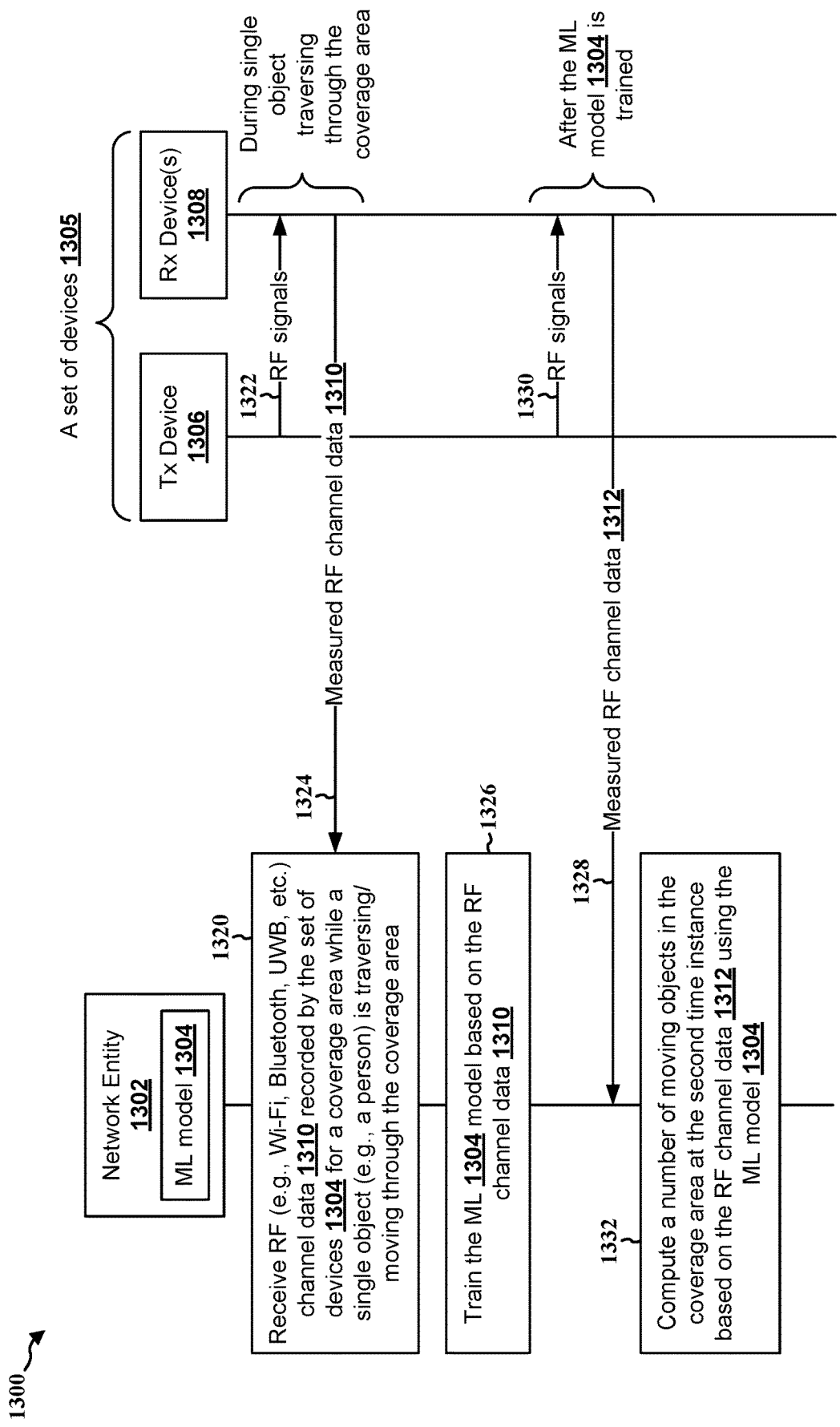
FIG. 13 is a communication flow illustrating an example of training a network entity (or its corresponding ML model)

FIG. 13 is a communication flow 1300 illustrating an example of training a network entity (or its corresponding ML model) to perform multi-person passive RF positioning (e.g., passive Wi-Fi/Bluetooth/UWB positioning) based on a single-person data in accordance with various aspects of the present disclosure. The numberings associated with the communication flow 1300 do not specify a particular temporal order and are merely used as references for the communication flow 1300.

At 1320, a network entity 1302 (e.g., a positioning/location server, an indoor positioning system, a passive positioning system, a UE, a network node, etc.) may receive RF channel data 1310 (e.g., Wi-Fi channel data, Bluetooth channel data, UWB channel data, etc.) that is recorded by a set of devices 1305 for a coverage area during a first time period while just a single object (e.g., a person) is traversing/moving through the coverage area.

For example, the set of devices 1305 may include at least one Tx device 1306 and one or more Rx device(s) 1308. As shown at 1322, while a single object (e.g., a person) is traversing/moving through the coverage area, the at least one Tx device 1306 may transmit RF signals to the Rx device(s) 1308, and the Rx device(s) 1308 may receive and measure the RF signals (e.g., the CSI samples of the RF signals). Then, as shown at 1324, the Rx device(s) 1308 may transmit the measured RF channel data 1310 to the network entity 1302.

At 1326, the network entity 1302 may train an ML model 1304 that is associated with the network entity 1302 (and is configured to perform the prediction/inferencing for the multi-person passive RF positioning) based on the RF channel data 1310 (and also based on the set of devices 1305), such as described in connection with FIGS. 6, 9A, 9B, and 10. For example, the ML model 1304 may be trained based on the weakly-supervised learning using a single-person moving data. After the ML model 1304 is trained, the ML model 1304 may perform the prediction/inferencing for the multi-person passive RF positioning, such as predicting/inferencing the number of moving people in the coverage area and/or their locations.

In one example, as described in connection with FIG. 10, the network entity 1302 may train the ML model 1304 based on a superposition of a set of samples randomly selected from the RF channel data 1310. In some implementations, the superposition may correspond to a weighted sum of the set of samples, where a channel power of each sample in the set of samples may be used as a corresponding weight, such as described in connection with 1006 of FIG. 10.

In another example, at 1320, the network entity 1302 may also receive a set of locations of the single object while the single object is moving across the coverage area during the first time period, and the network entity 1302 may associate the RF channel data 1310 with the set of locations of the single object, such as described in connection with FIG. 10. Then, the network entity 1302 may train the ML model 1304 further based on the association of the RF channel data 1310 with the set of locations of the single object. This may enable the network entity 1302 (or the ML model 1304) to also estimate a location for each moving object in the number of moving objects in the coverage area at the second time instance based on the second RF channel data 1312 using the ML model 1304. In some examples, if the training data does not include locations of the single object while the single object is moving through the coverage area, the network entity 1302 or the ML model 1304 may just predict the number of moving object in the coverage area, but may not be able to identify their locations. In some examples, as shown by FIGS. 9A, 9B, and 10, the coverage area may include a plurality of rooms, and each room in the plurality of rooms may be associated with a corresponding room ID or a corresponding room index. Then, the network entity 1302 may associate each subset of RF channel data 1310 with a corresponding room ID or a corresponding room index based on a set of inputs received from the single object (e.g., the single object may provide its location via a mobile application, such as shown at 614 of FIG. 6).

At 1328, after the ML model 1304 is trained, the network entity 1302 may receive RF channel data 1312 recorded by the set of devices 1305 at a second time instance that is outside of the first time period (e.g., after the ML model 1304 is trained). For example, if the network entity 1302 is configured/requested to determine whether there are any moving objects in the coverage area and/or locations of the moving objects, the network entity 1302 may request the at least one Tx device 1306 to transmit RF signals (e.g., Wi-Fi signals, Bluetooth signals, UWB signals, 4G LTE/5G NR related signals, etc.) to the Rx device(s) 1308 as shown at 1330, and the Rx device(s) 1308 may receive and measure the RF signals (e.g., the CSI samples of the RF signals) and transmit the measured RF channel data 1312 to the network entity 1302 as shown at 1328.

At 1332, the network entity 1302 may compute a number of moving objects in the coverage area at the second time instance based on the RF channel data 1312 using the ML model 1304, such as described in connection with FIGS. 9A, 9B, and 10. For example, by utilizing pattern/signal of a single-person at two locations of a coverage area (e.g., in a bed room and in a kitchen of an indoor environment) as shown by FIGS. 9A and 9B, if there are two people moving in the coverage area at similar two locations as shown by FIG. 10, the ML model 1304 may be able to detect their presence and their locations (e.g., the room they are in) based on their (individual) RF channel data (e.g., after cancelling out or separating other common signals).

In one example, during the training of the ML model 1304 at 1326, the network entity 1302 may decompose a superposition of the RF channel data 1310 into a first plurality of CSI samples, where each CSI sample in the first plurality of CSI samples may be associated with a pattern of a single object in the number of moving objects. Then, the network entity 1302 may store the first plurality of CSI samples and their corresponding patterns for the single object in a database. Then, when the network entity 1302 is computing the number of moving objects in the coverage area at the second time instance based on the RF channel data 1312 using the ML model 1304 (e.g., at 1332), the network entity 1302 may decompose the superposition of the second RF channel data into a second plurality of CSI samples, and the network entity 1302 (or the ML model 1304) may identify the number of moving objects based on comparing the second plurality of CSI samples with the first plurality of CSI samples in the database. In some examples, the superposition of the first RF channel data and the superposition of the second RF channel data may be decomposed using a source separation mechanism, such as described in connection with FIG. 12.

FIG. 14 is a flowchart 1400 of a method of wireless communication. The method may be performed by a network entity (e.g., the base station 102; the location servers 168; the indoor positioning system 602; the neural network architecture 1102; the network entity 1302, 1602). The method may enable the network entity (or its associated ML model) to be trained to identify multiple moving objects based on using training data for a single object.

At 1402, the network entity may receive first RF channel data recorded by a set of devices for a coverage area during a first time period, such as described in connection with FIGS. 6-13. For example, as shown at 1324 of FIG. 13, the network entity 1302 may receive RF channel data 1324 recorded by the set of devices 1305 for a coverage area during a first time period (during a ML model training period). The reception of the first RF channel data may be performed by, e.g., the passive positioning component 199, the RU processor 1642, and/or the transceiver(s) 1646 of the network entity 1602 in FIG. 16.

At 1404, the network entity may train an ML model based on the set of devices and the first RF channel data, such as described in connection with FIGS. 6-13. For example, as shown at 1326 of FIG. 13, the network entity 1302 may train the ML model 1304 based on the RF channel data 1310. The training of the ML model may be performed by, e.g., the passive positioning component 199, the RU processor 1642, and/or the transceiver(s) 1646 of the network entity 1602 in FIG. 16.

In one example, as shown at 1410, to train the ML model based on the set of devices and the first RF channel data, the network entity may train the ML model based on a superposition of a set of samples randomly selected from the first RF channel data. In some implementations, the superposition may correspond to a weighted sum of the set of samples, a channel power of each sample in the set of samples being used as a corresponding weight.

At 1406, the network entity may receive second RF channel data recorded by the set of devices at a second time instance that is outside of the first time period, such as described in connection with FIGS. 6-13. For example, as shown at 1328 of FIG. 13, the network entity 1302 may receive RF channel data 1312 recorded by the set of devices 1305 at a second time instance that is outside of the first time period (e.g., after the ML model 1304 is trained). The reception of the second RF channel data may be performed by, e.g., the passive positioning component 199, the RU processor 1642, and/or the transceiver(s) 1646 of the network entity 1602 in FIG. 16.

In one example, the first RF channel data may correspond to a first set of CSI samples and the second RF channel data may correspond to a second set of CSI samples.

At 1408, the network entity may compute a number of moving objects in the coverage area at the second time instance based on the second RF channel data using the ML model, such as described in connection with FIGS. 6-13. For example, as shown at 1332 of FIG. 13, the network entity 1302 may compute a number of moving objects in the coverage area at the second time instance based on the RF channel data 1312 using the ML model 1304. The computation of the number of moving objects in the coverage area may be performed by, e.g., the passive positioning component 199, the RU processor 1642, and/or the transceiver(s) 1646 of the network entity 1602 in FIG. 16.

In some examples, the set of devices includes at least one transmitting device and at least one receiving device. In one example, as shown at 1412, the network entity may configure the at least one transmitting device to transmit a set of RF signals, and the network entity may configure the at least one receiving device to record the first RF channel data based on the set of RF signals while one object is moving in the coverage area during the first time period. In some implementations, the one object may correspond to a single user.

In another example, as shown at 1414, the network entity may configure the at least one transmitting device to transmit a set of RF signals, the network entity may configure the at least one receiving device to record the first RF channel data based on the set of RF signals and a set of locations of an object while the object is moving across the coverage area during the first time period, and the network entity may associate the first RF channel data with the set of locations of the object. In some implementations, the network entity may train the ML model further based on the association of the first RF channel data with the set of locations of the object, and the network entity may estimate a location for each moving object in the number of moving objects in the coverage area at the second time instance based on the second RF channel data using the ML model. In some implementations, the coverage area may include a plurality of rooms, and to configure the at least one receiving device to record the first RF channel data and the set of locations of object while the object is moving across the coverage area during the first time period, the network entity may configure the at least one receiving device to record the first RF channel data and the set of locations of the object while the object is moving across the plurality of rooms during the first time period. In some examples, each room in the plurality of rooms is associated with a corresponding room ID or a corresponding room index, and to associate the first RF channel data with the set of locations of the object, the network entity may associate each subset of the first RF channel data with the corresponding room ID or the corresponding room index based on a set of inputs received from the object.

In another example, as shown at 1416, to train the ML model based on the set of devices and the first RF channel data, the network entity may decompose a superposition of the first RF channel data into a first plurality of CSI samples, where each CSI sample in the first plurality of CSI samples may be associated with a pattern of a single object in the number of moving objects, and the network entity may store the first plurality of CSI samples and their corresponding patterns for the single object in a database. In some implementations, to compute the number of moving objects in the coverage area at the second time instance based on the second RF channel data using the ML model, the network entity may decompose a superposition of the second RF channel data into a second plurality of CSI samples, and the network entity may identify the number of moving objects based on comparing the second plurality of CSI samples with the first plurality of CSI samples in the database. In some implementations, the superposition of the first RF channel data and the superposition of the second RF channel data may be decomposed using a source separation mechanism.

FIG. 15 is a flowchart 1500 of a method of wireless communication. The method may be performed by a network entity (e.g., the base station 102; the location servers 168; the indoor positioning system 602; the neural network architecture 1102; the network entity 1302, 1602). The method may enable the network entity (or its associated ML model) to be trained to identify multiple moving objects based on using training data for a single object.

At 1502, the network entity may receive first RF channel data recorded by a set of devices for a coverage area during a first time period, such as described in connection with FIGS. 6-13. For example, as shown at 1324 of FIG. 13, the network entity 1302 may receive RF channel data 1324 recorded by the set of devices 1305 for a coverage area during a first time period (during a ML model training period). The reception of the first RF channel data may be performed by, e.g., the passive positioning component 199, the RU processor 1642, and/or the transceiver(s) 1646 of the network entity 1602 in FIG. 16.

At 1504, the network entity may train an ML model based on the set of devices and the first RF channel data, such as described in connection with FIGS. 6-13. For example, as shown at 1326 of FIG. 13, the network entity 1302 may train the ML model 1304 based on the RF channel data 1310. The training of the ML model may be performed by, e.g., the passive positioning component 199, the RU processor 1642, and/or the transceiver(s) 1646 of the network entity 1602 in FIG. 16.

In one example, to train the ML model based on the set of devices and the first RF channel data, the network entity may train the ML model based on a superposition of a set of samples randomly selected from the first RF channel data. In some implementations, the superposition may correspond to a weighted sum of the set of samples, a channel power of each sample in the set of samples being used as a corresponding weight.

At 1506, the network entity may receive second RF channel data recorded by the set of devices at a second time instance that is outside of the first time period, such as described in connection with FIGS. 6-13. For example, as shown at 1328 of FIG. 13, the network entity 1302 may receive RF channel data 1312 recorded by the set of devices 1305 at a second time instance that is outside of the first time period (e.g., after the ML model 1304 is trained). The reception of the second RF channel data may be performed by, e.g., the passive positioning component 199, the RU processor 1642, and/or the transceiver(s) 1646 of the network entity 1602 in FIG. 16.

In one example, the first RF channel data may correspond to a first set of CSI samples and the second RF channel data may correspond to a second set of CSI samples.

At 1508, the network entity may compute a number of moving objects in the coverage area at the second time instance based on the second RF channel data using the ML model, such as described in connection with FIGS. 6-13. For example, as shown at 1332 of FIG. 13, the network entity 1302 may compute a number of moving objects in the coverage area at the second time instance based on the RF channel data 1312 using the ML model 1304. The computation of the number of moving objects in the coverage area may be performed by, e.g., the passive positioning component 199, the RU processor 1642, and/or the transceiver(s) 1646 of the network entity 1602 in FIG. 16.

In some examples, the set of devices includes at least one transmitting device and at least one receiving device. In one example, the network entity may configure the at least one transmitting device to transmit a set of RF signals, and the network entity may configure the at least one receiving device to record the first RF channel data based on the set of RF signals while one object is moving in the coverage area during the first time period. In some implementations, the one object may correspond to a single user.

In another example, the network entity may configure the at least one transmitting device to transmit a set of RF signals, the network entity may configure the at least one receiving device to record the first RF channel data based on the set of RF signals and a set of locations of an object while the object is moving across the coverage area during the first time period, and the network entity may associate the first RF channel data with the set of locations of the object. In some implementations, the network entity may train the ML model further based on the association of the first RF channel data with the set of locations of the object, and the network entity may estimate a location for each moving object in the number of moving objects in the coverage area at the second time instance based on the second RF channel data using the ML model. In some implementations, the coverage area may include a plurality of rooms, and to configure the at least one receiving device to record the first RF channel data and the set of locations of object while the object is moving across the coverage area during the first time period, the network entity may configure the at least one receiving device to record the first RF channel data and the set of locations of the object while the object is moving across the plurality of rooms during the first time period. In some examples, each room in the plurality of rooms is associated with a corresponding room ID or a corresponding room index, and to associate the first RF channel data with the set of locations of the object, the network entity may associate each subset of the first RF channel data with the corresponding room ID or the corresponding room index based on a set of inputs received from the object.

In another example, to train the ML model based on the set of devices and the first RF channel data, the network entity may decompose a superposition of the first RF channel data into a first plurality of CSI samples, where each CSI sample in the first plurality of CSI samples may be associated with a pattern of a single object in the number of moving objects, and the network entity may store the first plurality of CSI samples and their corresponding patterns for the single object in a database. In some implementations, to compute the number of moving objects in the coverage area at the second time instance based on the second RF channel data using the ML model, the network entity may decompose a superposition of the second RF channel data into a second plurality of CSI samples, and the network entity may identify the number of moving objects based on comparing the second plurality of CSI samples with the first plurality of CSI samples in the database. In some implementations, the superposition of the first RF channel data and the superposition of the second RF channel data may be decomposed using a source separation mechanism.

FIG. 16 is a diagram 1600 illustrating an example of a hardware implementation for a network entity 1602. The network entity 1602 may be a BS, a component of a BS, or may implement BS functionality. The network entity 1602 may include at least one of a CU 1610, a DU 1630, or an RU 1640. For example, depending on the layer functionality handled by the passive positioning component 199, the network entity 1602 may include the CU 1610; both the CU 1610 and the DU 1630; each of the CU 1610, the DU 1630, and the RU 1640; the DU 1630; both the DU 1630 and the RU 1640; or the RU 1640. The CU 1610 may include a CU processor 1612. The CU processor 1612 may include on-chip memory 1612'. In some aspects, the CU 1610 may further include additional memory modules 1614 and a communications interface 1618. The CU 1610 communicates with the DU 1630 through a midhaul link, such as an F1 interface. The DU 1630 may include a DU processor 1632. The DU processor 1632 may include on-chip memory 1632'. In some aspects, the DU 1630 may further include additional memory modules 1634 and a communications interface 1638. The DU 1630 communicates with the RU 1640 through a fronthaul link. The RU 1640 may include an RU processor 1642. The RU processor 1642 may include on-chip memory 1642'. In some aspects, the RU 1640 may further include additional memory modules 1644, one or more transceivers 1646, antennas 1680, and a communications interface 1648. The RU 1640 communicates with the UE 104. The on-chip memory 1612', 1632', 1642' and the additional memory modules 1614, 1634, 1644 may each be considered a computer-readable medium/memory. Each computer-readable medium/memory may be non-transitory. Each of the processors 1612, 1632, 1642 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the passive positioning component 199 may be configured to receive first RF channel data recorded by a set of devices for a coverage area during a first time period. The passive positioning component 199 may also be configured to train an ML model based on the set of devices and the first RF channel data. The passive positioning component 199 may also be configured to receive second RF channel data recorded by the set of devices at a second time instance that is outside of the first time period. The passive positioning component 199 may also be configured to compute a number of moving objects in the coverage area at the second time instance based on the second RF channel data using the ML model. The passive positioning component 199 may be within one or more processors of one or more of the CU 1610, DU 1630, and the RU 1640. The passive positioning component 199 may be one or more hardware components specifically configured to carry out the stated processes/algorithm, implemented by one or more processors configured to perform the stated processes/algorithm, stored within a computer-readable medium for implementation by one or more processors, or some combination thereof. The network entity 1602 may include a variety of components configured for various functions. In one configuration, the network entity 1602 may include means for receiving first RF channel data recorded by a set of devices for a coverage area during a first time period. The network entity 1602 may further include means for training an ML model based on the set of devices and the first RF channel data. The network entity 1602 may further include means for receiving second RF channel data recorded by the set of devices at a second time instance that is outside of the first time period. The network entity 1602 may further include means for computing a number of moving objects in the coverage area at the second time instance based on the second RF channel data using the ML model.

In one configuration, the means for training the ML model based on the set of devices and the first RF channel data may include configuring the network entity 1602 to train the ML model based on a superposition of a set of samples randomly selected from the first RF channel data. In some implementations, the superposition may correspond to a weighted sum of the set of samples, a channel power of each sample in the set of samples being used as a corresponding weight.

In another configuration, the first RF channel data may correspond to a first set of CSI samples and the second RF channel data may correspond to a second set of CSI samples.

In some configurations, the set of devices may include at least one transmitting device and at least one receiving device. In one configuration, the network entity 1602 may further include means for configuring the at least one transmitting device to transmit a set of RF signals, and means for configuring the at least one receiving device to record the first RF channel data based on the set of RF signals while one object is moving in the coverage area during the first time period. In some implementations, the one object may correspond to a single user.

In another configuration, the network entity 1602 may further include means for configuring the at least one transmitting device to transmit a set of RF signals, means for configuring the at least one receiving device to record the first RF channel data based on the set of RF signals and a set of locations of an object while the object is moving across the coverage area during the first time period, and means for associating the first RF channel data with the set of locations of the object. In some implementations, the network entity 1602 may further include means for training the ML model further based on the association of the first RF channel data with the set of locations of the object, and means for estimating a location for each moving object in the number of moving objects in the coverage area at the second time instance based on the second RF channel data using the ML model. In some implementations, the coverage area may include a plurality of rooms, and the means for configuring the at least one receiving device to record the first RF channel data and the set of locations of object while the object is moving across the coverage area during the first time period may include configuring the network entity 1602 to configure the at least one receiving device to record the first RF channel data and the set of locations of the object while the object is moving across the plurality of rooms during the first time period. In some configurations, each room in the plurality of rooms is associated with a corresponding room ID or a corresponding room index, and the means for associating the first RF channel data with the set of locations of the object may include configuring the network entity 1602 to associate each subset of the first RF channel data with the corresponding room ID or the corresponding room index based on a set of inputs received from the object.

In another configuration, the means for training the ML model based on the set of devices and the first RF channel data may include configuring the network entity 1602 to decompose a superposition of the first RF channel data into a first plurality of CSI samples, where each CSI sample in the first plurality of CSI samples may be associated with a pattern of a single object in the number of moving objects, and store the first plurality of CSI samples and their corresponding patterns for the single object in a database. In some implementations, to means for computing the number of moving objects in the coverage area at the second time instance based on the second RF channel data using the ML model may include configuring the network entity 1602 to decompose a superposition of the second RF channel data into a second plurality of CSI samples, and identify the number of moving objects based on comparing the second plurality of CSI samples with the first plurality of CSI samples in the database. In some implementations, the superposition of the first RF channel data and the superposition of the second RF channel data may be decomposed using a source separation mechanism.

The means may be the passive positioning component 199 of the network entity 1602 configured to perform the functions recited by the means. As described supra, the network entity 1602 may include the TX processor 316, the RX processor 370, and the controller/processor 375. As such, in one configuration, the means may be the TX processor 316, the RX processor 370, and/or the controller/processor 375 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. If a first apparatus receives data from or transmits data to a second apparatus, the data may be received/transmitted directly between the first and second apparatuses, or indirectly between the first and second apparatuses through a set of apparatuses. A device configured to "output" data, such as a transmission, signal, or message, may transmit the data, for example with a transceiver, or may send the data to a device that transmits the data. A device configured to "obtain" data, such as a transmission, signal, or message, may receive, for example with a transceiver, or may obtain the data from a device that receives the data. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is a method of wireless communication at a network entity, including: receiving first RF channel data recorded by a set of devices for a coverage area during a first time period; training an ML model based on the set of devices and the first RF channel data; receiving second RF channel data recorded by the set of devices at a second time instance that is outside of the first time period; and computing a number of moving objects in the coverage area at the second time instance based on the second RF channel data using the ML model.

Aspect 2 is the method of aspect 1, where training the ML model based on the set of devices and the first RF channel data includes: training the ML model based on a superposition of a set of samples randomly selected from the first RF channel data.

Aspect 3 is the method of aspect 2, where the superposition corresponds to a weighted sum of the set of samples, a channel power of each sample in the set of samples being used as a corresponding weight.

Aspect 4 is the method of any of aspects 1 to 3, where the first RF channel data corresponds to a first set of CSI samples and the second RF channel data corresponds to a second set of CSI samples.

Aspect 5 is the method of any of aspects 1 to 4, where the set of devices includes at least one transmitting device and at least one receiving device.

Aspect 6 is the method of aspect 5, further including: configuring the at least one transmitting device to transmit a set of RF signals; and configuring the at least one receiving device to record the first RF channel data based on the set of RF signals while one object is moving in the coverage area during the first time period.

Aspect 7 is the method of aspect 6, where the one object corresponds to a single user.

Aspect 8 is the method of aspect 5, further including: configuring the at least one transmitting device to transmit a set of RF signals; configuring the at least one receiving device to record the first RF channel data based on the set of RF signals and a set of locations of an object while the object is moving across the coverage area during the first time period; and associating the first RF channel data with the set of locations of the object.

Aspect 9 is the method of aspect 8, further including: training the ML model further based on the association of the first RF channel data with the set of locations of the object; and estimating a location for each moving object in the number of moving objects in the coverage area at the second time instance based on the second RF channel data using the ML model.

Aspect 10 is the method of aspect 8, where the coverage area includes a plurality of rooms, and where configuring the at least one receiving device to record the first RF channel data and the set of locations of the object while the object is moving across the coverage area during the first time period includes: configuring the at least one receiving device to record the first RF channel data and the set of locations of the object while the object is moving across the plurality of rooms during the first time period.

Aspect 11 is the method of aspect 10, where each room in the plurality of rooms is associated with a corresponding room ID or a corresponding room index, and where associating the first RF channel data with the set of locations of the object includes: associating each subset of the first RF channel data with the corresponding room ID or the corresponding room index based on a set of inputs received from the object.

Aspect 12 is the method of any of aspects 1 to 11, where training the ML model based on the set of devices and the first RF channel data includes: decomposing a superposition of the first RF channel data into a first plurality of CSI samples, where each CSI sample in the first plurality of CSI samples is associated with a pattern of a single object in the number of moving objects; and storing the first plurality of CSI samples and their corresponding patterns for the single object in a database.

Aspect 13 is the method of aspect 12, where computing the number of moving objects in the coverage area at the second time instance based on the second RF channel data using the ML model includes: decomposing a superposition of the second RF channel data into a second plurality of CSI samples; and identifying the number of moving objects based on comparing the second plurality of CSI samples with the first plurality of CSI samples in the database.

Aspect 14 is the method of aspect 13, where the superposition of the first RF channel data and the superposition of the second RF channel data are decomposed using a source separation mechanism.

Aspect 15 is the method of any of aspects 1 to 14, where the first RF channel data and the second RF channel data are associated with a Wi-Fi channel, a Bluetooth channel, an ultra-wideband (UWB) channel, a network channel, or a combination thereof.

Aspect 16 is an apparatus for wireless communication at a network entity, including: a memory; and at least one processor coupled to the memory and, based at least in part on information stored in the memory, the at least one processor is configured to implement any of aspects 1 to 15.

Aspect 17 is the apparatus of aspect 16, further including at least one of a transceiver or an antenna coupled to the at least one processor.

Aspect 18 is an apparatus for wireless communication including means for implementing any of aspects 1 to 15.

Aspect 19 is a computer-readable medium (e.g., a non-transitory computer-readable medium) storing computer executable code, where the code when executed by a processor causes the processor to implement any of aspects 1 to 15.

What is claimed is:

1. An apparatus for wireless communication at a network entity, comprising:
at least one memory; and
at least one processor coupled to the at least one memory, and the at least one processor is configured to:
receive first radio frequency (RF) channel data recorded by at least one receiving device in a set of devices for a coverage area during a first time period, wherein the first RF channel data is based on measurement of a first set of RF signals from at least one transmitting device in the set of devices;
train a machine learning (ML) model based on the set of devices and the first RF channel data;
receive second RF channel data recorded by the at least one receiving device in the set of devices at a second time instance that is outside of the first time period, wherein the second RF channel data is based on measurement of a second set of RF signals from the at least one transmitting device in the set of devices; and
compute a number of moving objects in the coverage area at the second time instance based on the second RF channel data using the ML model, wherein the moving objects exclude the set of devices.

2. The apparatus of claim 1, wherein to train the ML model based on the set of devices and the first RF channel data, the at least one processor is configured to:
train the ML model based on superposition of a set of samples randomly selected from the first RF channel data.

3. The apparatus of claim 2, wherein the superposition corresponds to a weighted sum of the set of samples, a channel power of each sample in the set of samples being used as a corresponding weight.

4. The apparatus of claim 1, wherein the first RF channel data corresponds to a first set of channel state information (CSI) samples and the second RF channel data corresponds to a second set of CSI samples.

5. The apparatus of claim 1, wherein the at least one processor is further configured to:
configure the at least one transmitting device to transmit the first set of RF signals; and
configure the at least one receiving device to record the first RF channel data based on the first set of RF signals while one object is moving in the coverage area during the first time period.

6. The apparatus of claim 5, wherein the one object corresponds to a single user.

7. The apparatus of claim 1, wherein the at least one processor is further configured to:
configure the at least one transmitting device to transmit the first set of RF signals;
configure the at least one receiving device to record the first RF channel data based on the first set of RF signals and a set of locations of an object while the object is moving across the coverage area during the first time period; and
associate the first RF channel data with the set of locations of the object.

8. The apparatus of claim 7, wherein the at least one processor is further configured to:
train the ML model further based on the association of the first RF channel data with the set of locations of the object; and
estimate a location for each moving object in the number of moving objects in the coverage area at the second time instance based on the second RF channel data using the ML model.

9. The apparatus of claim 7, wherein the coverage area includes a plurality of rooms, and to configure the at least one receiving device to record the first RF channel data and the set of locations of the object while the object is moving across the coverage area during the first time period, the at least one processor is configured to:
configure the at least one receiving device to record the first RF channel data and the set of locations of the object while the object is moving across the plurality of rooms during the first time period.

10. The apparatus of claim 9, wherein each room in the plurality of rooms is associated with a corresponding room identification (ID) or a corresponding room index, and to associate the first RF channel data with the set of locations of the object, the at least one processor is configured to:
associate each subset of the first RF channel data with the corresponding room ID or the corresponding room index based on a set of inputs received from the object.

11. The apparatus of claim 1, wherein to train the ML model based on the set of devices and the first RF channel data, the at least one processor is configured to:
decompose a superposition of the first RF channel data into a first plurality of channel state information (CSI) samples, wherein each CSI sample in the first plurality of CSI samples is associated with a pattern of a single object in the number of moving objects; and
store the first plurality of CSI samples and their corresponding patterns for the single object in a database.

12. The apparatus of claim 11, wherein to compute the number of moving objects in the coverage area at the second time instance based on the second RF channel data using the ML model, the at least one processor is configured to:
decompose a superposition of the second RF channel data into a second plurality of CSI samples; and
identify the number of moving objects based on comparing the second plurality of CSI samples with the first plurality of CSI samples in the database.

13. The apparatus of claim 12, wherein to decompose the superposition of the first RF channel data and the superposition of the second RF channel data, the at least one processor is configured to decompose the superposition of the first RF channel data and the superposition of the second RF channel data using a source separation mechanism.

14. The apparatus of claim 1, wherein the first RF channel data and the second RF channel data are associated with a Wi-Fi channel, a Bluetooth channel, an ultra-wideband (UWB) channel, or a network channel.

15. A method of wireless communication at a network entity, comprising:
receiving first radio frequency (RF) channel data recorded by at least one receiving device in a set of devices for a coverage area during a first time period, wherein the first RF channel data is based on measurement of a first set of RF signals from at least one transmitting device in the set of devices;
training a machine learning (ML) model based on the set of devices and the first RF channel data;
receiving second RF channel data recorded by the at least one receiving device in the set of devices at a second time instance that is outside of the first time period, wherein the second RF channel data is based on measurement of a second set of RF signals from the at least one transmitting device in the set of devices; and
computing a number of moving objects in the coverage area at the second time instance based on the second RF channel data using the ML model, wherein the moving objects exclude the set of devices.

16. The method of claim 15, wherein training the ML model based on the set of devices and the first RF channel data comprises:
training the ML model based on superposition of a set of samples randomly selected from the first RF channel data.

17. The method of claim 16, wherein the superposition corresponds to a weighted sum of the set of samples, a channel power of each sample in the set of samples being used as a corresponding weight.

18. The method of claim 15, wherein the first RF channel data corresponds to a first set of channel state information (CSI) samples and the second RF channel data corresponds to a second set of CSI samples.

19. The method of claim 15, further comprising:
configuring the at least one transmitting device to transmit the first set of RF signals; and
configuring the at least one receiving device to record the first RF channel data based on the first set of RF signals while one object is moving in the coverage area during the first time period.

20. The method of claim 19, wherein the one object corresponds to a single user.

21. The method of claim 15, further comprising:
configuring the at least one transmitting device to transmit the first set of RF signals;
configuring the at least one receiving device to record the first RF channel data based on the first set of RF signals and a set of locations of an object while the object is moving across the coverage area during the first time period; and
associating the first RF channel data with the set of locations of the object.

22. The method of claim 21, further comprising:
training the ML model further based on the association of the first RF channel data with the set of locations of the object; and
estimating a location for each moving object in the number of moving objects in the coverage area at the second time instance based on the second RF channel data using the ML model.

23. The method of claim 21, wherein the coverage area includes a plurality of rooms, and wherein configuring the at least one receiving device to record the first RF channel data and the set of locations of the object while the object is moving across the coverage area during the first time period comprises:
configuring the at least one receiving device to record the first RF channel data and the set of locations of the object while the object is moving across the plurality of rooms during the first time period.

24. The method of claim 23, wherein each room in the plurality of rooms is associated with a corresponding room identification (ID) or a corresponding room index, and wherein associating the first RF channel data with the set of locations of the object comprises:
associating each subset of the first RF channel data with the corresponding room ID or the corresponding room index based on a set of inputs received from the object.

25. The method of claim 15, wherein training the ML model based on the set of devices and the first RF channel data comprises:
decomposing a superposition of the first RF channel data into a first plurality of channel state information (CSI) samples, wherein each CSI sample in the first plurality of CSI samples is associated with a pattern of a single object in the number of moving objects; and
storing the first plurality of CSI samples and their corresponding patterns for the single object in a database.

26. The method of claim 25, wherein computing the number of moving objects in the coverage area at the second time instance based on the second RF channel data using the ML model comprises:
decomposing a superposition of the second RF channel data into a second plurality of CSI samples based on a source separation mechanism; and
identifying the number of moving objects based on comparing the second plurality of CSI samples with the first plurality of CSI samples in the database.

27. An apparatus for wireless communication at a network entity, comprising:
means for receiving first radio frequency (RF) channel data recorded by at least one receiving device in a set of devices for a coverage area during a first time period, wherein the first RF channel data is based on measurement of a first set of RF signals from at least one transmitting device in the set of devices;
means for training a machine learning (ML) model based on the set of devices and the first RF channel data;
means for receiving second RF channel data recorded by the at least one receiving device in the set of devices at a second time instance that is outside of the first time period, wherein the second RF channel data is based on measurement of a second set of RF signals from the at least one transmitting device in the set of devices; and
means for computing a number of moving objects in the coverage area at the second time instance based on the second RF channel data using the ML model, wherein the moving objects exclude the set of devices.

28. A non-transitory computer-readable medium storing computer executable code at a network entity, the code when executed by a processor causes the processor to:
receive first radio frequency (RF) channel data recorded by at least one receiving device in a set of devices for a coverage area during a first time period, wherein the first RF channel data is based on measurement of a first set of RF signals from at least one transmitting device in the set of devices;
train a machine learning (ML) model based on the set of devices and the first RF channel data;
receive second RF channel data recorded by the at least one receiving device in the set of devices at a second time instance that is outside of the first time period, wherein the second RF channel data is based on measurement of a second set of RF signals from the at least one transmitting device in the set of devices; and
compute a number of moving objects in the coverage area at the second time instance based on the second RF channel data using the ML model, wherein the moving objects exclude the set of devices.

* * * * *